(12) United States Patent
Olivier

(10) Patent No.: US 11,531,104 B2
(45) Date of Patent: Dec. 20, 2022

(54) FULL WAVEFORM MULTI-PULSE OPTICAL RANGEFINDER INSTRUMENT

(71) Applicant: LeddarTech Inc., Québec (CA)

(72) Inventor: Pierre Olivier, Lévis (CA)

(73) Assignee: LeddarTech Inc., Québec (CA)

( * ) Notice: Subject to any disclaimer, the term of this patent is extended or adjusted under 35 U.S.C. 154(b) by 277 days.

(21) Appl. No.: 16/650,473

(22) PCT Filed: Oct. 3, 2018

(86) PCT No.: PCT/IB2018/057702
§ 371 (c)(1),
(2) Date: Mar. 25, 2020

(87) PCT Pub. No.: WO2019/069260
PCT Pub. Date: Apr. 11, 2019

(65) Prior Publication Data
US 2020/0241141 A1    Jul. 30, 2020

Related U.S. Application Data

(60) Provisional application No. 62/614,669, filed on Jan. 8, 2018, provisional application No. 62/567,385, filed on Oct. 3, 2017.

(51) Int. Cl.
*G01S 17/42*    (2006.01)
*G01S 17/931*   (2020.01)
*G01S 7/4865*   (2020.01)

(52) U.S. Cl.
CPC ............ *G01S 17/42* (2013.01); *G01S 7/4866* (2013.01); *G01S 17/931* (2020.01)

(58) Field of Classification Search
CPC ...... G01S 17/42; G01S 7/4866; G01S 17/931; G01S 7/4817; G01S 7/487; G01S 17/89
See application file for complete search history.

(56) References Cited

U.S. PATENT DOCUMENTS

| 6,433,856 B1 | 8/2002 | Yoo |
| 2015/0260843 A1 | 9/2015 | Lewis |
| 2016/0047895 A1 | 2/2016 | Dussan |

(Continued)

FOREIGN PATENT DOCUMENTS

| EP | 1850150 A1 | 10/2007 | |
| EP | 2762920 A1 * | 8/2014 | ............ G01S 17/10 |
| WO | 2018127789 | 7/2018 | |

OTHER PUBLICATIONS

Google Translation EP 2762920 (A1), Aug. 6, 2014.*

(Continued)

*Primary Examiner* — Yuen Wong
(74) *Attorney, Agent, or Firm* — Blueshift IP, LLC; Robert Plotkin

(57) ABSTRACT

There is provided a method for optically scanning a region according to a plurality of scanning directions, comprising: receiving an interleave sequence defining a scanning order for the plurality of scanning directions; sequentially propagating optical pulses according to the interleave sequence; detecting pulse echoes corresponding to a reflection of the propagated optical pulses on at least one object present within the region; and outputting the detected pulse echoes. There is further described a computer-implemented method for correcting a temporal slippage of an optical echo.

10 Claims, 29 Drawing Sheets

(56) References Cited

U.S. PATENT DOCUMENTS

2017/0155225 A1    6/2017  Villeneuve
2018/0188368 A1    7/2018  Zuffada

OTHER PUBLICATIONS

International Search Report & Written Opinion dated Jan. 8, 2019, in international patent application PCT/IB2018/057702, 9 pages.

\* cited by examiner

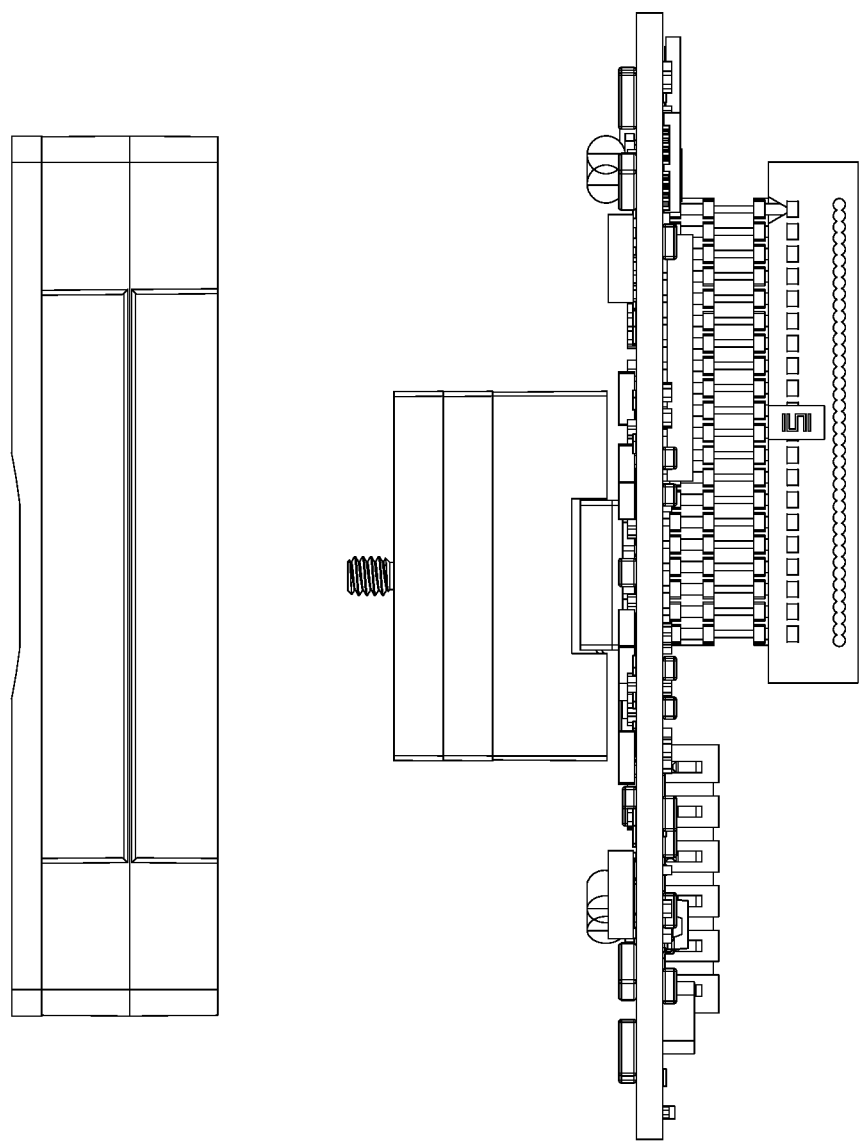

FULL WAVEFORM MULTI-PULSE OPTICAL RANGEFINDER INSTRUMENT

TECHNICAL FIELD

The invention relates to optical rangefinder instruments and more particularly, to a full waveform multi-pulse system.

BACKGROUND

Autonomous driving requires the vehicle to be aware of its environment under all lighting and environmental conditions. Cameras, radar and ultrasonic sensors are currently used but there is a need for a more robust solution.

Lidar has emerged as a potential solution. Mechanical scanners have been used in proof of concept embodiments but there is a strong consensus that they do not meet the industry requirements for performance, reliability and cost. 3D flash lidars are also commercially available but offer limited range and a very high cost.

Therefore, there is a need for an improved rangefinder instrument.

SUMMARY

According to a first broad aspect, there is provided a method for optically scanning a region according to a plurality of scanning directions, comprising: receiving an interleave sequence defining a scanning order for the plurality of scanning directions; sequentially propagating optical pulses according to the interleave sequence; detecting pulse echoes corresponding to a reflection of the propagated optical pulses on at least one object present within the region; and outputting the detected pulse echoes.

In one embodiment, the step of receiving the interleave sequence comprises: receiving the plurality of scanning directions; and generating the interleave sequence.

In one embodiment, the step of receiving the plurality of scanning directions comprises: receiving a total scanning range; receiving one of a number of scanning directions and a field of view per scanning direction; and determining the scanning directions.

In one embodiment, the step of generating the interleave sequence comprises: splitting the plurality of scanning directions into a plurality of the direction subassemblies; and generating the interleave sequence using the direction subassemblies.

In one embodiment, the method further comprises repeating: said sequentially propagating optical pulses according to the interleave sequence; said detecting pulse echoes corresponding to a reflection of the propagated optical pulses on at least one object present within the region; and said outputting the detected pulse echoes.

In accordance with a second broad aspect, there is provided a system for optically scanning a region according to a plurality of scanning directions, comprising: a controller for receiving an interleave sequence defining a scanning order or sequence for the plurality of scanning directions; a pulsed light source for sequentially propagating optical pulses according to the interleave sequence; a photodetector for detecting pulse echoes corresponding to a reflection of the propagated optical pulses on at least one object present within the region; and outputting the detected pulse echoes.

In one embodiment, the controller is configured for: receiving the plurality of scanning directions; and generating the interleave sequence.

In one embodiment, the controller is configured for: receiving a total scanning range; receiving one of a number of scanning directions and a field of view per scanning direction; and determining the scanning directions.

In one embodiment, the controller is configured for: splitting the plurality of scanning directions into a plurality of the direction subassemblies; and generating the interleave sequence using the direction subassemblies.

In one embodiment, the system is further configured for repeating: said sequentially propagating optical pulses according to the interleave sequence; said detecting pulse echoes corresponding to a reflection of the propagated optical pulses on at least one object present within the region; and said outputting the detected pulse echoes.

According to a third broad aspect, there is provided a method for optically scanning a region comprising an object, comprising: emitting a first optical pulse at a first emission point in time to investigate the region; detecting a first echo associated with a reflection of the first optical pulse on the object, the first echo corresponding to a first intensity of detected light as a function of time starting from the first point in time; emitting a second optical pulse at a second point in time being different from the first point in time; detecting a second echo associated with a reflection of the second optical pulse on the object, the second echo corresponding to a second intensity of detected light as a function of time starting from the second point in time; receiving a speed of displacement; determining a correction time using the speed of displacement, the first and second points in time and a speed of light; correcting the second echo using the correction time, thereby obtaining a corrected echo; and outputting the corrected echo.

In one embodiment, the step of receiving the speed of displacement comprises receiving a speed for a vehicle on which a pulsed light source and a photodetector are mounted, the pulsed light source for emitting the first and second optical pulses and the photodetector for detecting the first and second echoes.

In one embodiment, the step of receiving the speed for the vehicle comprises measuring the speed of the vehicle.

In one embodiment, the step of correcting the second echo comprises temporally translating the second intensity of detected light as a function of time by an amount corresponding to the correction time.

According to another broad aspect, there is provided a system for optically scanning a region comprising an object, comprising: a pulsed light source for emitting a first optical pulse at a first emission point in time to investigate the region and emitting a second optical pulse at a second point in time being different from the first point in time; a photodetector for detecting a first echo associated with a reflection of the first optical pulse on the object and a second echo associated with a reflection of the second optical pulse on the object, the first echo corresponding to a first intensity of detected light as a function of time starting from the first point in time and the second echo corresponding to a second intensity of detected light as a function of time starting from the second point in time; and a correction unit for: receiving a speed of displacement; determining a correction time using the speed of displacement, the first and second points in time and a speed of light; correcting the second echo using the correction time, thereby obtaining a corrected echo; and outputting the corrected echo.

In one embodiment, the correction unit is configured for receiving a speed for a vehicle on which the pulsed light source and the photodetector are mounted.

In one embodiment, the system further comprises a device for measuring the speed of displacement.

In one embodiment, the correction unit is configured for temporally translating the second intensity of detected light as a function of time by an amount corresponding to the correction time.

According to a further broad aspect, there is provided a computer-implemented method for correcting a temporal slippage of an optical echo, comprising: receiving a first echo associated with a reflection of a first optical pulse on an object, the first optical pulse being emitted at a first emission point in time to investigate a region of interest, the first echo corresponding to a first intensity of detected light as a function of time starting from the first point in time; receiving a second echo associated with a reflection of a second optical pulse on the object, the second optical pulse being emitted at a second point in time being different from the first point in time, the second echo corresponding to a second intensity of detected light as a function of time starting from the second point in time; receiving a speed of displacement; determining a correction time using the speed of displacement, the first and second points in time and a speed of light; correcting the second echo using the correction time, thereby obtaining a corrected echo; and outputting the corrected echo.

In one embodiment, the step of receiving the speed of displacement comprises receiving a speed for a vehicle on which a pulsed light source used for emitting and a photodetector are mounted, the pulsed light source for emitting the first and second optical pulses and the photodetector for detecting the first and second echoes.

In one embodiment, the step of receiving the speed for the vehicle comprises measuring the speed of the vehicle.

In one embodiment, the step of said correcting the second echo comprising temporally translating the second intensity of detected light as a function of time by an amount corresponding to the correction time.

According to still another broad aspect, there is provided a system for correcting a temporal slippage of an optical echo, comprising: a correction determining module configured for: receiving a first echo associated with a reflection of a first optical pulse on an object, the first optical pulse being emitted at a first emission point in time to investigate a region of interest, the first echo corresponding to a first intensity of detected light as a function of time starting from the first point in time; receiving a second echo associated with a reflection of a second optical pulse on the object, the second optical pulse being emitted at a second point in time being different from the first point in time, the second echo corresponding to a second intensity of detected light as a function of time starting from the second point in time; and receiving a speed of displacement; and determining a correction time using the speed of displacement, the first and second points in time and a speed of light; and a correction applying module configured for: correcting the second echo using the correction time, thereby obtaining a corrected echo; and outputting the corrected echo.

In one embodiment, the correction determining module is configured for receiving a speed for a vehicle on which a pulsed light source and a photodetector are mounted, the pulsed light source for emitting the first and second optical pulses and the photodetector for detecting the first and second echoes.

In one embodiment, the system further comprises a device for measuring the speed of displacement.

In one embodiment, the correction applying module is configured for temporally translating the second intensity of detected light as a function of time by an amount corresponding to the correction time.

BRIEF DESCRIPTION OF THE DRAWINGS

Further features and advantages of the present invention will become apparent from the following detailed description, taken in combination with the appended drawings, in which:

FIG. 5A illustrates an echo trace, according to the prior at;

FIG. 20B is a side view of the anamorphic lens of FIG. 10a;

FIG. 20C is a front view of the anamorphic lens of FIG. 10a;

It will be noted that throughout the appended drawings, like features are identified by like reference numerals.

DETAILED DESCRIPTION

Overview of the Optical Rangefinder Configuration

Figure 1:
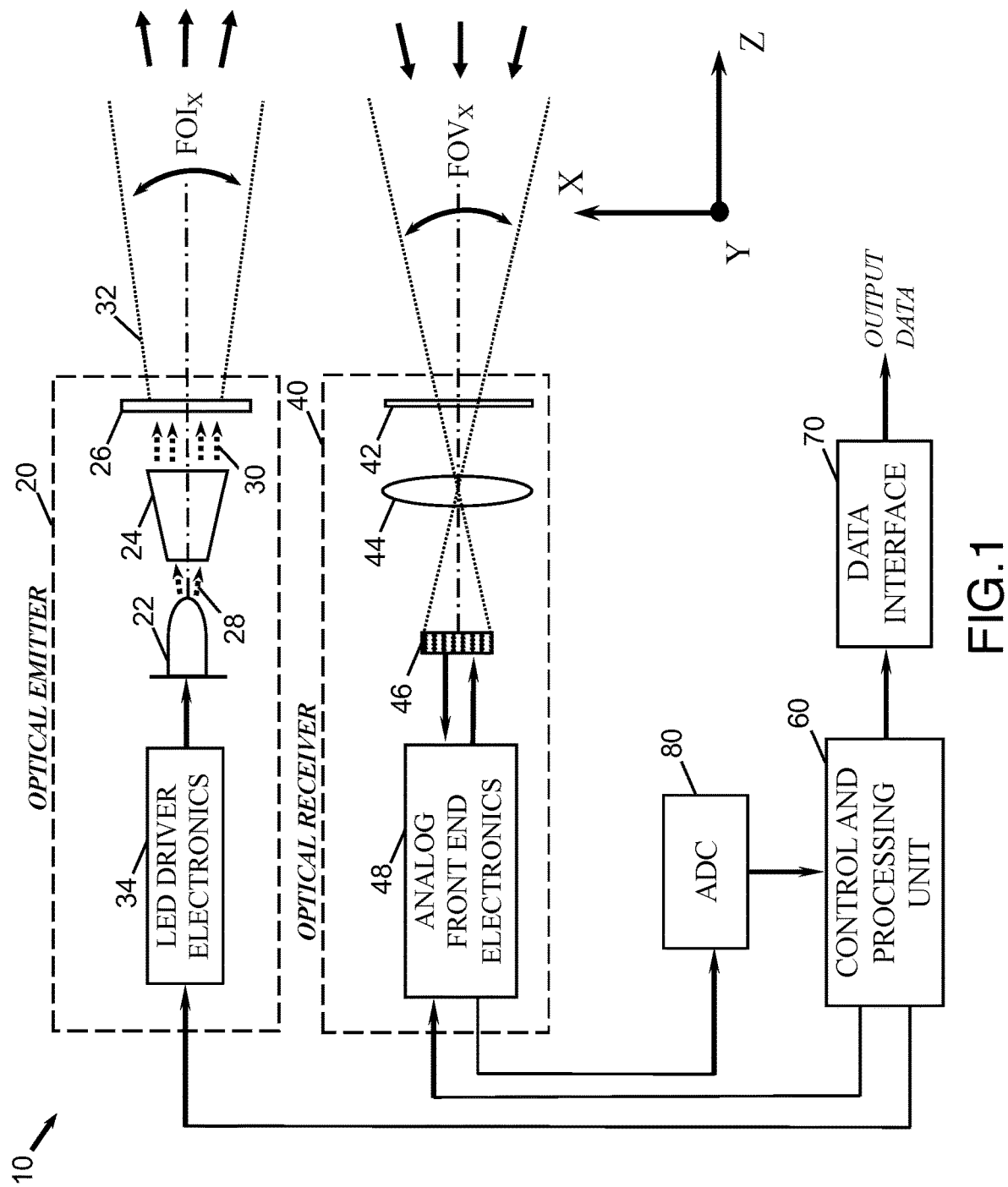
FIG. 1 is a schematic diagram illustrating the general layout and the key components that form part of an optical rangefinder instrument according to the prior art.
Figure 2:
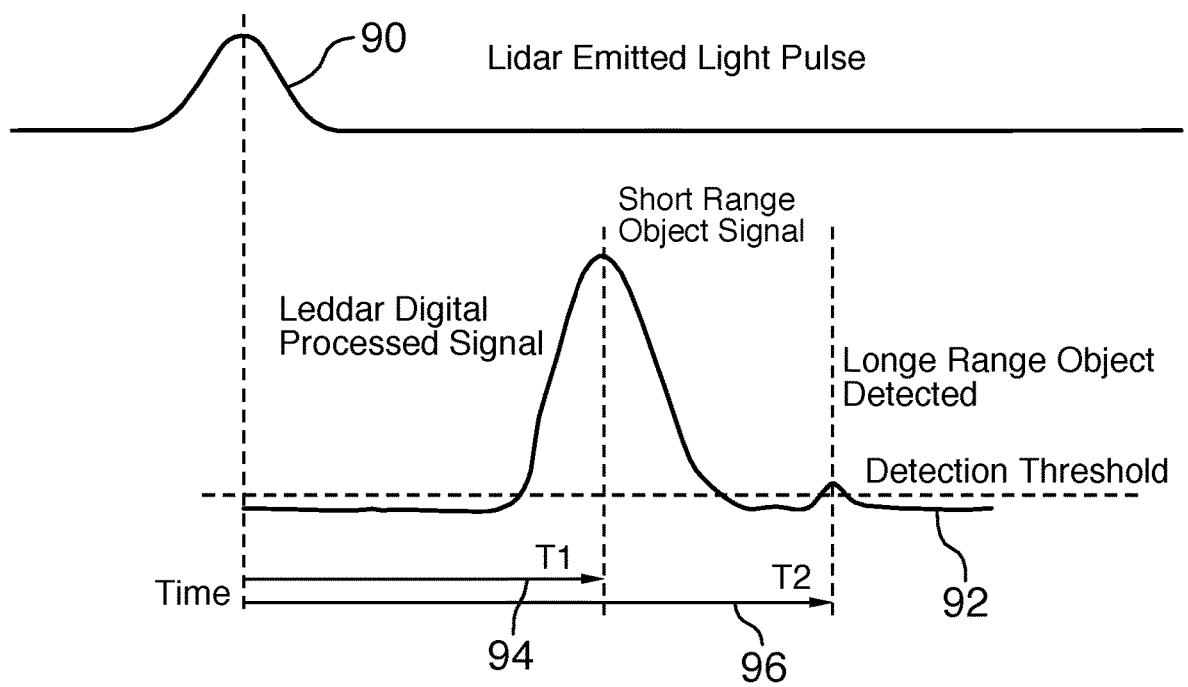
FIG. 2 illustrates the timing of a lidar emitted light pulse and a return signal waveform with two detection peaks, in accordance with an embodiment.

The general layout and key components/subsystems of a prior art optical rangefinder 10 can be better appreciated by referring to the schematic diagram of FIG. 1. The optical rangefinder 10, which operates according to the pulsed time-of-flight (TOF) principle, comprises an optical emitter 20 that emits trains of optical pulses having predetermined temporal and spatial characteristics. It also includes an optical receiver 40 for detection of the optical return signals and their subsequent conversion into electrical waveforms. The detection channel of the optical receiver 40 outputs return signal waveforms that could contain at least one peak that stands out from noise. A return signal waveform is obtained after the emission of each light pulse by the optical emitter 20, but it may happen that the waveform carries no useful information at a given moment. On the other hand, each peak present in a return signal waveform is a signature of an object currently located within the field of view (FOV) of the detection channel. FIG. 2 shows the timing of a lidar emitted light pulse 90 and a return signal waveform 92 with two detection peaks, namely a short range object 94 and a long range object 96. In a case with multiple channels, several consecutive channels may generate waveforms containing exactly the same signature (also referred to as a pulse echo) when, for example, a large object is ranged (ex.: wall) or when an object gets in close proximity of the instrument.

According to the pulsed TOF principle, the exact position (timing) of a signature in a return signal waveform is indicative of the range to the object while its relative amplitude depends on both range and optical reflectance of the object at the emission wavelength of the optical emitter 20. FIG. 1 also shows that the output of the optical receiver 40 connects to a control and processing unit (CPU) 60 that performs further processing of the return signal waveforms (after they have been converted into digital format by the Analog-to-Digital Converter (ADC) 80) and transmission of the output data to the data interface 70.

The CPU 60 stores a full waveform trace of the echo-back signal during and after illumination of the field of view by the optical pulse. The length of time during which the acquisition of the trace takes place is longer than the pulse width in order to allow capture of a full waveform trace of a reflection on an object multiple meters away from the detector with a pulse width less than 50 ns and a low duty cycle. Therefore the acquisition allows capturing and storing individual complete temporal waveform traces from a moment when the emission of the pulse begins over a length of time continuing after the emission of the pulse has ended and ending before emission of the next short light pulse. Furthermore, multiple sampling points must be acquired for the trace to allow the comparison with the emitted waveform. The CPU 60 performs some other functions such as generating a pulse trigger signal that is forwarded to the optical emitter 20 for firing each light pulse. Synchronization trigger signal (in phase or shifted) is also sent to the optical receiver 40 for starting the acquisition of the return signal waveforms. The CPU controls the acquisition by starting and stopping the waveform acquisition. The acquisition time is determined by the maximum range to be covered by the optical rangefinder 10.

The optical rangefinder 10 also includes means for supplying electrical power to the various subsystems depicted in FIG. 1. For clarity, these power supplies have not been shown in FIG. 1.

The Optical Emitter

The optical emitter 20 radiates very brief light pulses, each having for example a duration of a few ns, and this duration sets a lower bound for the width (duration) of the signatures that could be present in the return signal waveforms generated at the output of the optical receiver 40. In practice, the shortest duration that can be achieved for the light pulses is limited by the impulse responses of both the driver electronics and the light source integrated in the optical emitter 20. The signatures in the return signal waveforms will be faithful replicas of the emitted light pulses provided that the overall detection bandwidth of the optical receiver 40 is high enough, generally in the range of a few tens to a few hundred MHz.

On the spectral side, the spectrum of the emitted light pulses lies for example in the near-infrared region of the electromagnetic spectrum. Some factors favor the use of near infrared light such as the availability of affordable, compact optical sources and high sensitivity photodetectors, the weaker response of the unaided human eye to near-infrared light, which makes the radiated light pulses non distracting, and the weaker solar irradiance background level in this spectral region as compared to the corresponding level in the visible wavelength region. Visible light can also be used for example when the need to illuminate the environment is required (global illumination or signaling information using light). The visible light could be a white light or could be emitted at a specific wavelength or range of wavelengths, for example to generate a red light.

In the embodiment of FIG. 1, at least one high-power light-emitting diode (LED) unit is used to form the LED source 22 of the optical emitter 20. The light emitted by the LED source 22 can be optically conditioned to be spread over a desired field of illumination (FOI) by using for example a collimating lens assembly 24 followed by an optical diffuser 26, as depicted in FIG. 1. The collimating lens assembly 24 could have a high input numerical aperture to promote better capture of the highly-diverging raw output light beam 28 emitted from the LED source 22. The lens assembly 24 redirects the captured light to form in its exit aperture plane a light irradiance distribution 30 having a transverse cross-section suited to the dimensions of the optical diffuser 26. Likewise, the lens assembly 24 reduces the divergence angle of the emitted light beam 28 to a few degrees to ensure that the specified optical diffusing characteristics of the diffuser 26 will be met. Upon its transmission through the optical diffuser 26, the light beam is converted into an asymmetric light cone 32 having an opening (divergence) angle that defines the FOI of the optical emitter 20. In addition to providing a FOI with a smooth, uniform light irradiance distribution, the use of an optical diffuser 26 facilitates the mounting of the LED source 22. The spatial characteristics of the light beam 32 exiting from the diffuser 26 are nearly insensitive to the exact disposition and alignment of the individual LED units integrated in the LED source 22. As a result, various FOIs can be obtained from the same LED source 22 simply by using optical diffusers 26 with different light diffusing characteristics. Holographic optical diffusers have peak optical transmissions which can reach 90% and even higher at the desired wavelength. Moreover, holographic light-shaping diffusers can be designed to spread the incoming light over a prescribed (asymmetric) FOI, which can have divergence angles that differ appreciably along both horizontal and vertical directions for best use in optical rangefinders intended for various applications. This type of optical diffuser is also appreciated for its nearly Gaussian-shaped, smooth output light irradiance distribution.

Other ways for optically conditioning the light beam 28 emitted from the LED source 22 can be envisioned without departing from the scope of the present invention. For example, a LED source 22 can be integrated in the optical emitter 20 without any collimating lens assembly 24 or optical diffuser 26 when the intended application requires flooding light 32 over very wide FOIs (for example 120 degrees or wider) that are symmetrical along both orthogonal transverse directions. This cost-efficient approach is made possible due to the highly-diverging nature and smoothness of the raw output light emitted from LEDs. Furthermore, this approach allows for some tailoring of the resulting FOI by individually tuning the orientation of the center emission axis of each LED unit that forms part of the LED source 22. Alternatively, a lenticular lens sheet can substitute for the optical diffuser 26. Lenticular lens sheets generally consist of an extruded plastic sheet having one surface embossed with a set of linear tiny corrugations (called lenticules) running parallel to each other and acting as an array of magnifying lenses. Lenticular lenses are used for spreading light along a single transverse direction (perpendicular to the orientation of the lenticules), and can generate specific FOIs required by the intended applications. A LED reflector is also another possibility to shape the light at a very low cost.

Finally, the optical emitter 20 also includes electronics 34 for driving the LED source 22 with current pulses having peak amplitude and duration suitable for effective implementation of the pulsed TOF principle. As mentioned previously, a pulsed voltage trigger signal generated by the CPU 60 commands the generation of each current pulse by the LED driver electronics 34. For example, the optical pulses can be emitted with durations typically below 50 ns. Depending on the repetition rate at which the pulses are emitted, the duty cycle (relative ON time) of the optical emission can be as low as 0.1%. Driving the LED source 22 at low duty cycle allows for raising the peak current drive level at values that largely exceed the nominal current rating of the LED source 22 without compromising its lifetime. In order to get the desired peak optical output power for the radiated light pulses, any reduction of the peak drive level of the LEDs can be compensated for by mounting additional LED sources 22 in the optical emitter 20 and appropriately duplicating their drive electronics 34.

If the pulse width is smaller than 50 ns with a duty cycle of less than 0.1%, it will be possible to obtain an amplitude several times the nominal value. An example embodiment would have a 20 ns pulse width with a 0.2% duty cycle. Since Duty Cycle=Pulse Width×Frame Rate, the Frame Rate for that example would be 100 kHz. In another example embodiment, at a duty cycle of 0.5% and a pulse width of 50 ns, the system attains a frame rate of 100 kHz, namely 100,000 pulses are emitted per second. There is therefore a period of time of 10 μs between each pulse.

Since Range=Acquisition time×Speed of Light/2 and if the required range is 90 m, the acquisition of the full waveform will last 600 ns, much longer than the pulse width, it will begin when the pulse is emitted and will end before the next pulse is emitted. In another example embodiment, at a duty cycle of 0.1% and a pulse width of 20 ns, the system attains a frame rate of 50 kHz. These high frame rates are made possible by the use of LEDs with an appropriate Pulse/Modulation driver.

The optical emitter 20 may further benefit from the use of several LED sources 22 by performing individual alignment (optical boresighting) of each LED source 22 along a specific direction in such a way that the collective overlap of the radiated light beams results in a better filling (uniformity) of the FOI. This approach may provide a uniform FOI having the desired overall dimensions without the use of an optical diffuser 26.

The Optical Receiver

The optical receiver has an array of at least one detector. The array can be one-dimensional or two-dimensional.

In one embodiment, the optical detection and ranging of objects located within an overall FOV composed of a 1×N linear arrangement of N smaller FOVs extending along the horizontal direction is made possible with an optical receiver configuration 40 as shown in the schematic diagram of FIG. 1. In FIG. 1, the horizontal plane is set parallel to the plane of the page. The reference X axis, also shown in FIG. 1, is set horizontally along the direction perpendicular to the reference Z axis, the latter being parallel to the direction along which the optical axes of both optical emitter 20 and optical receiver 40 point (i.e., parallel to the line of sight of the instrument 10). The Y axis, orthogonal to both X and Z axes, then points along the vertical direction. The whole field of view is enclosed within a field of illumination (FOI) generated by the optical emitter of the optical rangefinder instrument.

The required horizontal extent $FOV_X$ varies with the intended application. For example, in automotive applications, it can attain around 15 degrees in systems for pre-crash mitigation, 40 degrees for blind-spot detection, and 85 degrees in systems for parking assistance. In an example embodiment, the overall field-of-view has a minimum overall extent of 15 degrees by 2.5 degrees. In another example embodiment, the overall field-of-view has an overall extent of 85 degrees by 13 degrees.

The optical return signal incident on the collecting aperture of the optical receiver 40 first passes through an optical filter 42 (optional) that blocks the portion of the parasitic background light having its wavelength spectrum out of a limited wavelength band determined by the emission spectrum of the optical emitter 20. The bandpass of the optical filter 42 should be selected relatively wide, and in some circumstances it can be advisable to operate the optical receiver 40 without any optical filter 42. For greater convenience, the optical filtering action can also be realized through the use of a commercially-available optical protection window having one of its faces coated with suitable optical films to block some parts of the optical wavelength spectrum. Alternatively, highly-resistant protection windows made from a material formulated to allow wavelength-selective optical transmission can be obtained.

The part of the optical return signal passing through the optical filter 42 is then transmitted through an objective 44 that focuses it onto the photosensitive surfaces of a series of photodetectors 46 disposed horizontally side-by-side in (or in close proximity of) the focal plane of the objective 44. The objective 44 may comprise a single lens element, as depicted schematically in FIG. 1, or it may be embodied as an optical assembly comprising several lens elements. Alternatively, the objective 44 can be built with mirrors or from a combination of mirrors and correcting lenses/plates.

The array of photodetectors 46 comprises a plurality of individual photodetectors having for example identical characteristics. As stated previously, the photosensitive surface area of each photodetector determines its corresponding FOV.

The optical receiver 40 of an example embodiment of the optical ranging instrument 10 also includes analog front end electronics 48 for conditioning of the raw electrical current waveforms at the outputs of the array 46 of PIN photodiodes. As it will be apparent to those skilled in the art, exemplary analog front end electronics 48 may consist of low-noise trans-impedance amplifiers, high-bandwidth amplifier stages, and low-voltage circuitry for biasing the array 46 of PIN photodiodes. The PIN array 46 and the multi-channel analog front end electronics 48 can share the same printed-circuit board, and they can be integrated for example in the form of an application-specific integrated circuit (ASIC).

The analog outputs of the front end electronics 48 are forwarded to an analog-to-digital converter (ADC) board 80 that digitizes the analog voltage waveforms. Digitization at rates of several tens to hundreds of megasamples per second for each detection channel provides adequate distance resolution to help reduce the occurrence of wash out of the signatures that could be present in the return signal waveforms. It can be noted that the duration of the signatures remains nearly the same since the instrument 10 senses objects present within the FOV. This means that the sampling frequency of the ADC board 80 can be selected high enough to sample each signature with a convenient number of sampling points. The length of time during which the acquisition of the trace takes place is longer than the pulse width in order to allow capture of a full waveform trace of a reflection on an object multiple meters away from the detector with a pulse width less than 50 ns and a low duty cycle. Furthermore, multiple sampling points must be acquired for the trace to allow the comparison with the emitted waveform. The acquisition process can also use shifting techniques to decrease the sampling frequency of the ADC 80.

The Control and Processing Unit (CPU)

The set of time-series numerical data streams at the output of the ADC board 80, i.e., the set of digitized return signal waveforms, is forwarded to the CPU 60 for further processing. The heart of the CPU 60 is for example a microprocessor assembly suited for embarked applications and capable of performing parallel processing with the required number of channels. CPU 60 can also revolve around other types of processing means such as a FPGA (Field-Programmable Gate Array), a DSP (Digital Signal Processor) or other programmable logics. The nature and extent of the numerical processing depend on the intended application. The CPU 60 can then communicate the output data to a higher-level system in which the optical rangefinder 10 can be integrated via a data interface 70 that operates under exemplary data communication interfaces such as Ethernet, USB or CAN-bus.

Numerical Processing of the Recorded Signal Waveforms

The optical rangefinder instrument 10 can be considered to be a full waveform LIDAR (Light Detection And Ranging) instrument since it can output a set of digitized return signal waveforms acquired during a suitable time interval dictated by the maximum range at which objects are to be detected and ranged. As compared to classical analog-type optical rangefinders which range objects by stopping an electronic counter as soon as a detected peak exceeds a predetermined threshold, full-waveform instruments provide greater flexibility by allowing a host of numerical processing tasks to be done on the recorded digital waveforms.

For example, the signal-to-noise ratio (SNR) of the signatures possibly present in the return signal waveforms associated to any given detection channel can be enhanced by averaging a number of successive waveforms acquired by the channel. The better SNRs obtained by standard signal averaging (accumulation) are possible provided that the noise contributions present in the successive waveforms are independent from each other and fully uncorrelated. When this condition is satisfied, which is often the case after proper elimination of the fixed pattern noise contributions, the SNR of the waveforms can be increased by a factor of $(nW)^{1/2}$, where nW is the number of averaged waveforms. Another condition that limits the number of waveforms to be averaged is the need for stationarity of the processes that generate the signatures. Stated otherwise, the properties (peak amplitude, shape, time/distance location) of the signatures present in the waveforms should remain unchanged during the time period required to record a complete set of waveforms that will be averaged. This condition may be difficult to respect when attempting to detect objects that move rapidly with respect to the optical rangefinder 10. The signatures associated to moving objects drift more or less appreciably from waveform to waveform. Although this situation frequently occurs in the applications to which to optical rangefinder 10 described herein is intended, its detrimental impacts can be alleviated by selecting the pulse repetition rate of the optical emitter 20 high enough, for example in the kHz range. Operating at high repetition rates enables the capture of numerous return signal waveforms during a time interval short enough to prevent noticeable drifts of the signatures associated to a given moving object. Another way of dealing with moving objects is to implement sophisticated numerical processing of the return signal waveforms specifically aimed at enhancing the SNR of signatures from moving objects.

Figure 3:
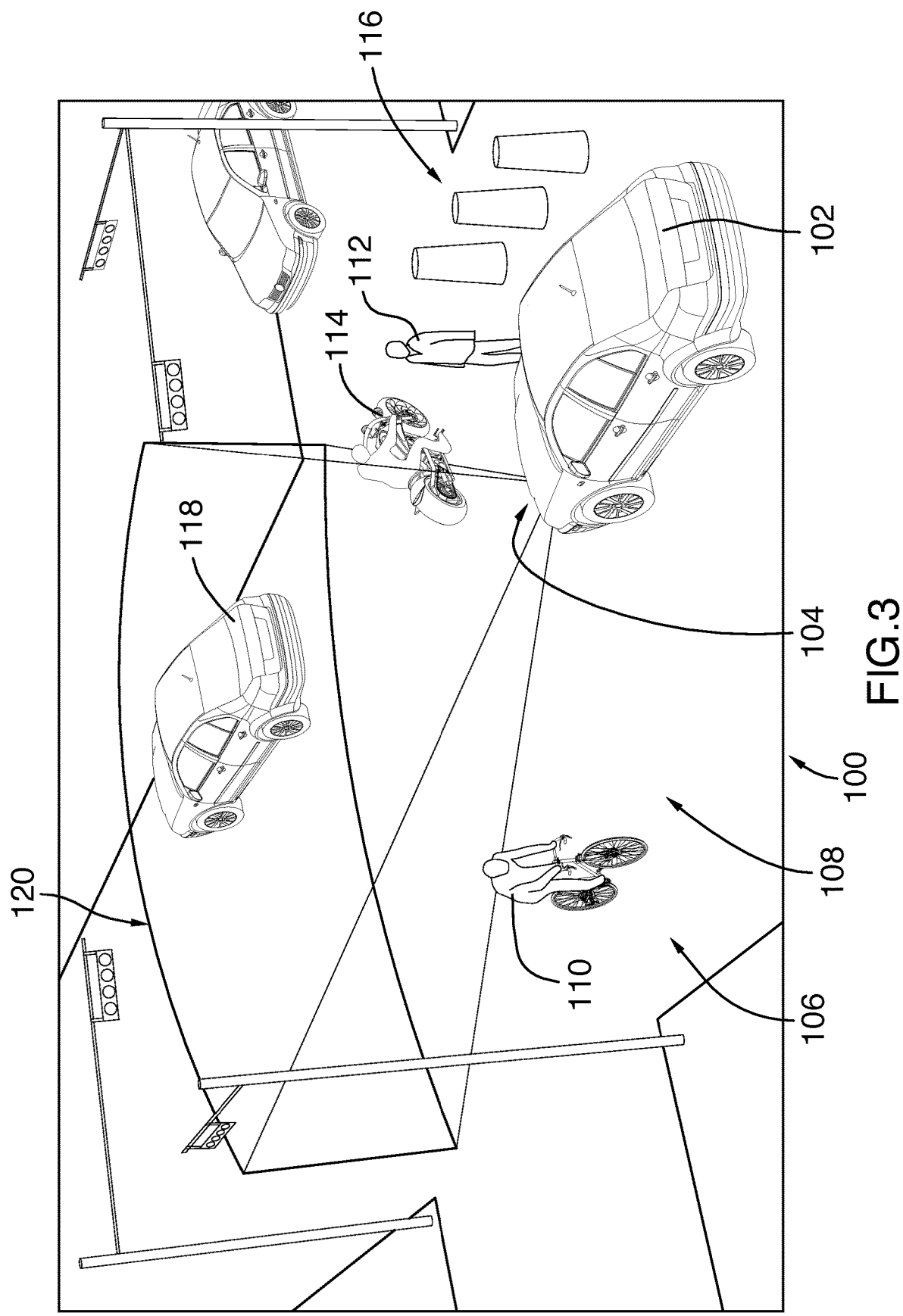
FIG. 3 shows a scene in which a vehicle stopped at an intersection is equipped with a 3D sensor, in accordance with an embodiment.

FIG. 3 shows a scene 100 in which a vehicle 102 is equipped with a 3D sensor 104. The vehicle 102 is stopped at an intersection 106 where a plurality of objects 108 including cyclist on a bicycle 110, pedestrian 112, motorcyclist on a motorcycle 114, road work barrels 116 and forward-facing vehicle 118, are present. The 3D field of view 120 of the 3D sensor 104 is graphically represented although it would not typically be apparent in a real-life embodiment.

Figure 4A:
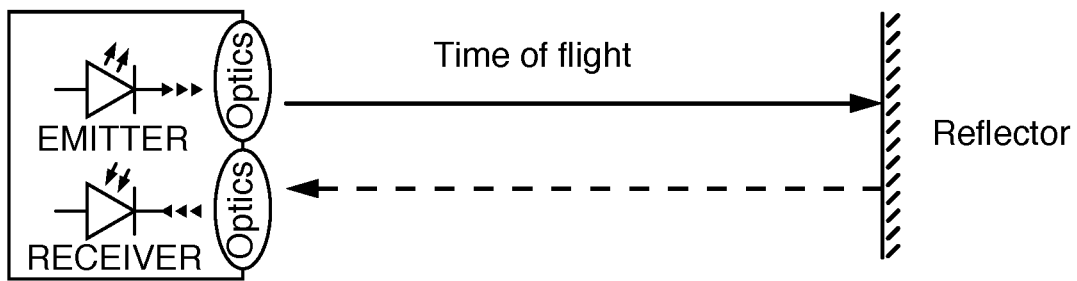
FIG. 4A illustrates the operation of a time-of-flight sensor in optimal conditions, according to the prior art.
Figure 4B:
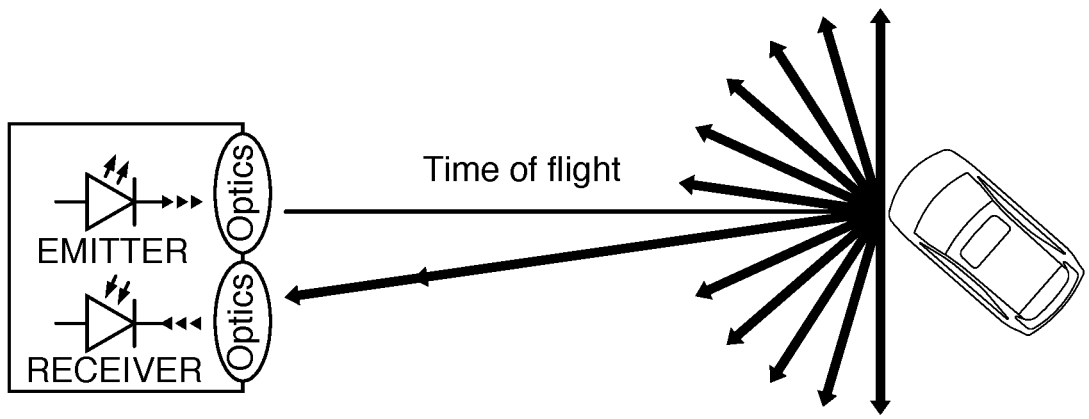
FIG. 4B illustrates the operation of the time-of-flight sensor of FIG. 4A in real conditions, according to the prior art.

As shown in FIG. 4A, in optimal situations in which a time-of-flight sensor having a narrow field of view is used to detect optical pulses reflected by a reflecting target, a strong signal is returned directly to the LiDAR receiver. In realistic situations, in which a time-of-flight sensor having a narrow field of view is used to detect optical pulses reflected by a natural target such as a vehicle, the incident light signal gets scattered as it hits the vehicle and only a small fraction of the light (decreasing with the square of distance) returns to the LiDAR receiver as shown in FIG. 4B. As is readily apparent, single-point LiDAR systems have a limited field of view (FOV). The single-point sensor does not directly cover the entire area to be observed. The returned signal has reduced intensity and effective range due to significant signal scattering.

Figure 5A:
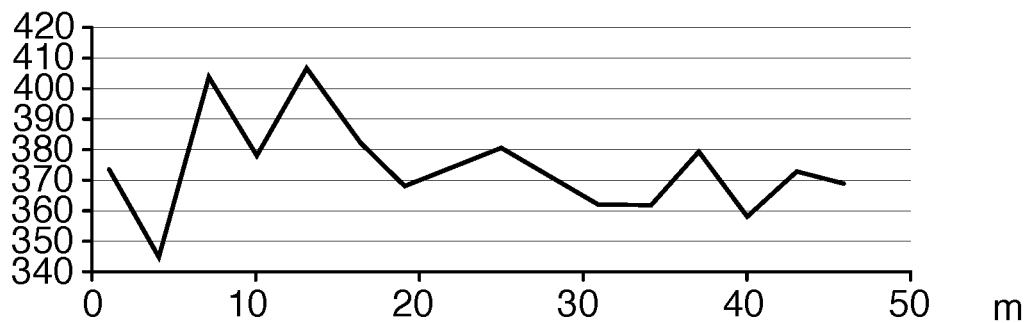
Figure 5B:
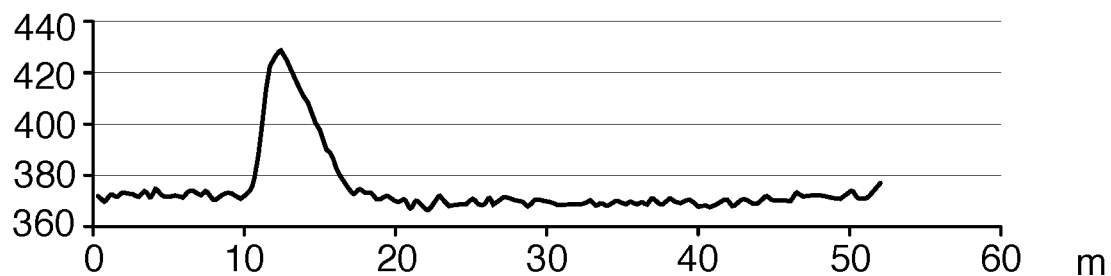
FIGS. 5B and 5C each illustrate an averaged echo trace, in accordance with the prior art.
Figure 5C:
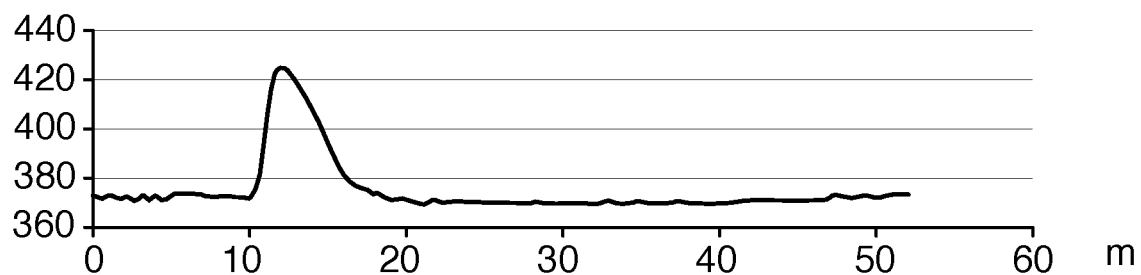
Figure 6:
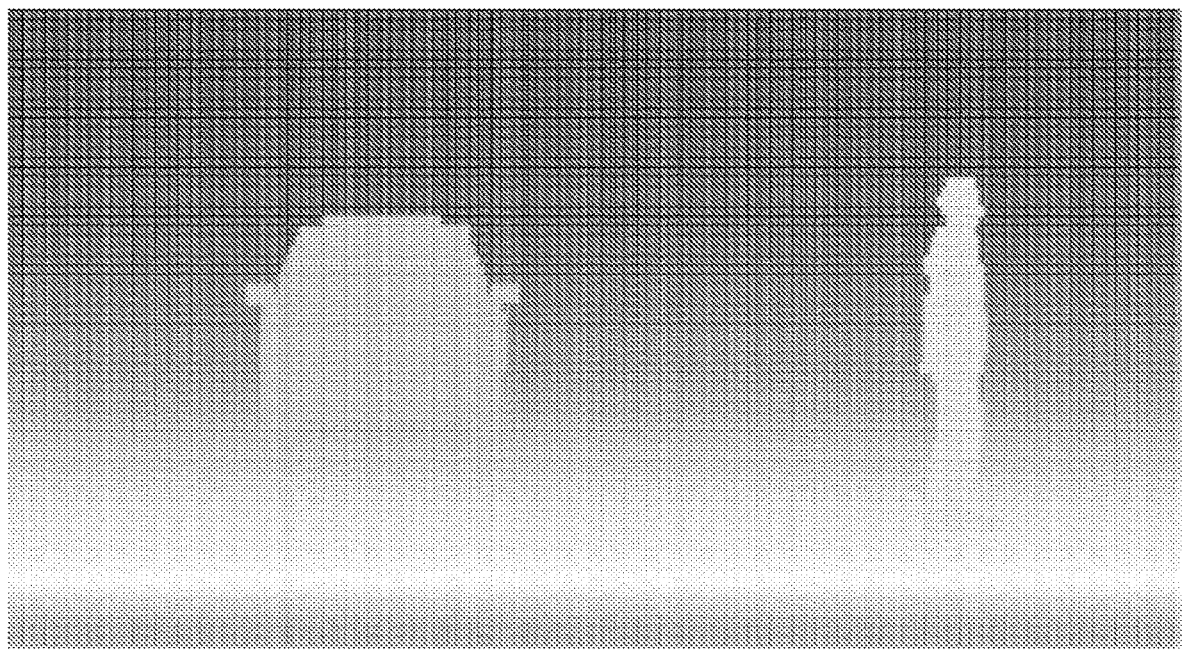
FIG. 6 illustrates a depth map with a greyscale coding used to represent what is viewed by the 3D sensor, in accordance with the prior art.

In practice, multiple echo traces of the type of FIG. 5A are accumulated and averaged to allow to smooth the signal as is shown in FIG. 5B and FIG. 5C. The improvement of the SNR increases with the number of accumulated echo traces. FIG. 6 shows a depth map with a greyscale coding used to represent what is viewed by the 3D sensor.

Figure 7:
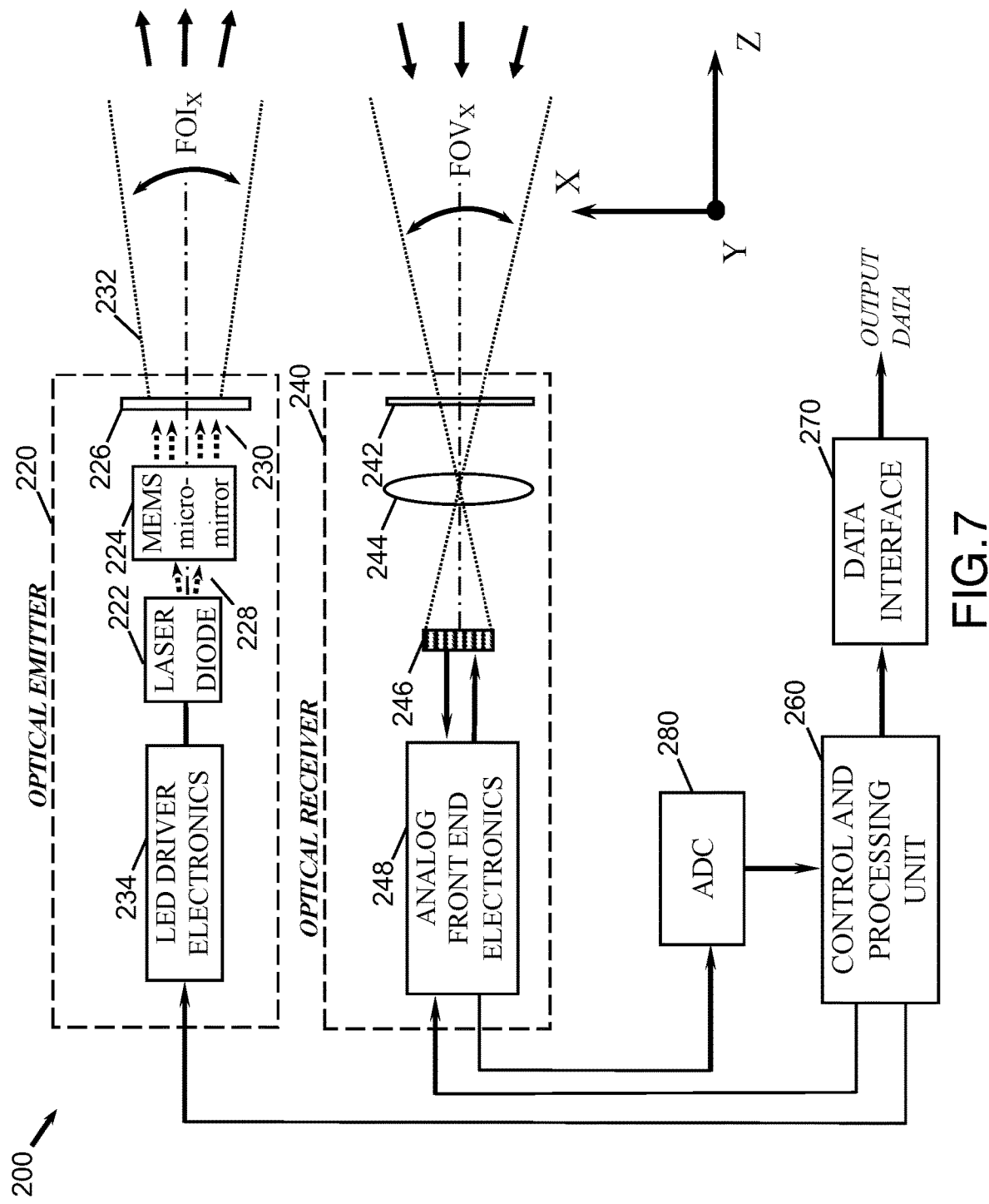
FIG. 7 is a block diagram of the main components of the Solid state Scanning LiDAR system, in accordance with an embodiment.

FIG. 7 shows an example block diagram of the main components of the Solid state Scanning LiDAR system. Light source 222, for example a laser diode, is provided with a beam steering element 224, such as a MEMS micro-mirror.

Figure 8:
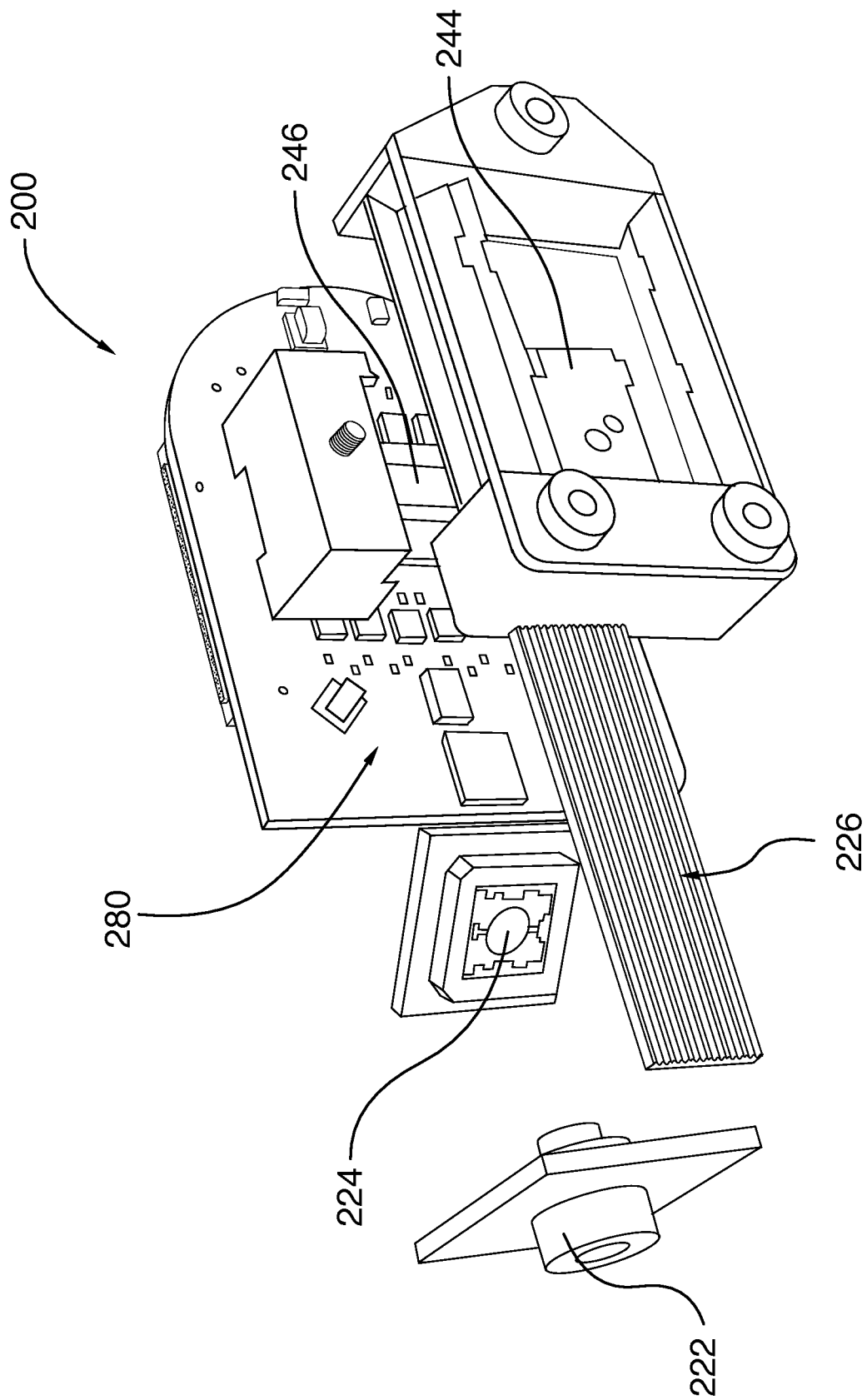
FIGS. 8 and 10-13 illustrate a physical representation of a rangefinder instrument, in accordance with an embodiment.
Figure 9:
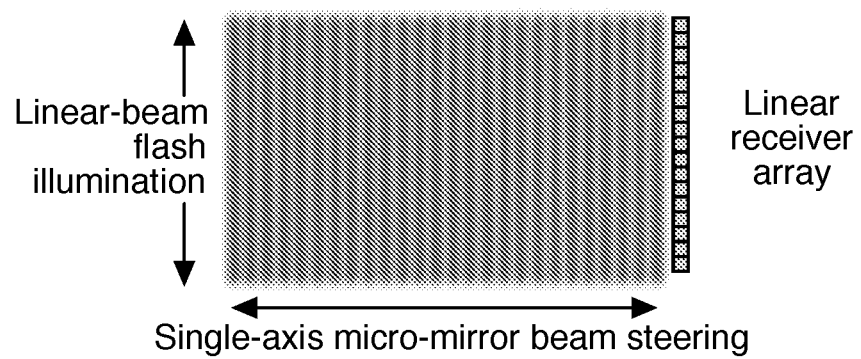
FIG. 9 illustrates a matrix of detection points, in accordance with an embodiment.

FIG. 8 shows a physical representation of the system components for an embodiment comprising a single emitter and a photodiode array, in which only the emitter is provided with a beam steering element.

This scanner uses a resonant MEMS micro-mirror with multiple-pulse measurement. There are two operating modes for MEMS mirrors, namely linear and resonant. Resonant mirrors offer fast motion, a large mechanical excursion and a high immunity to vibrations. Multiple-pulse measurement is the accumulation of multiple acquisitions to form a measure. It improves the SNR.

Figure 10:
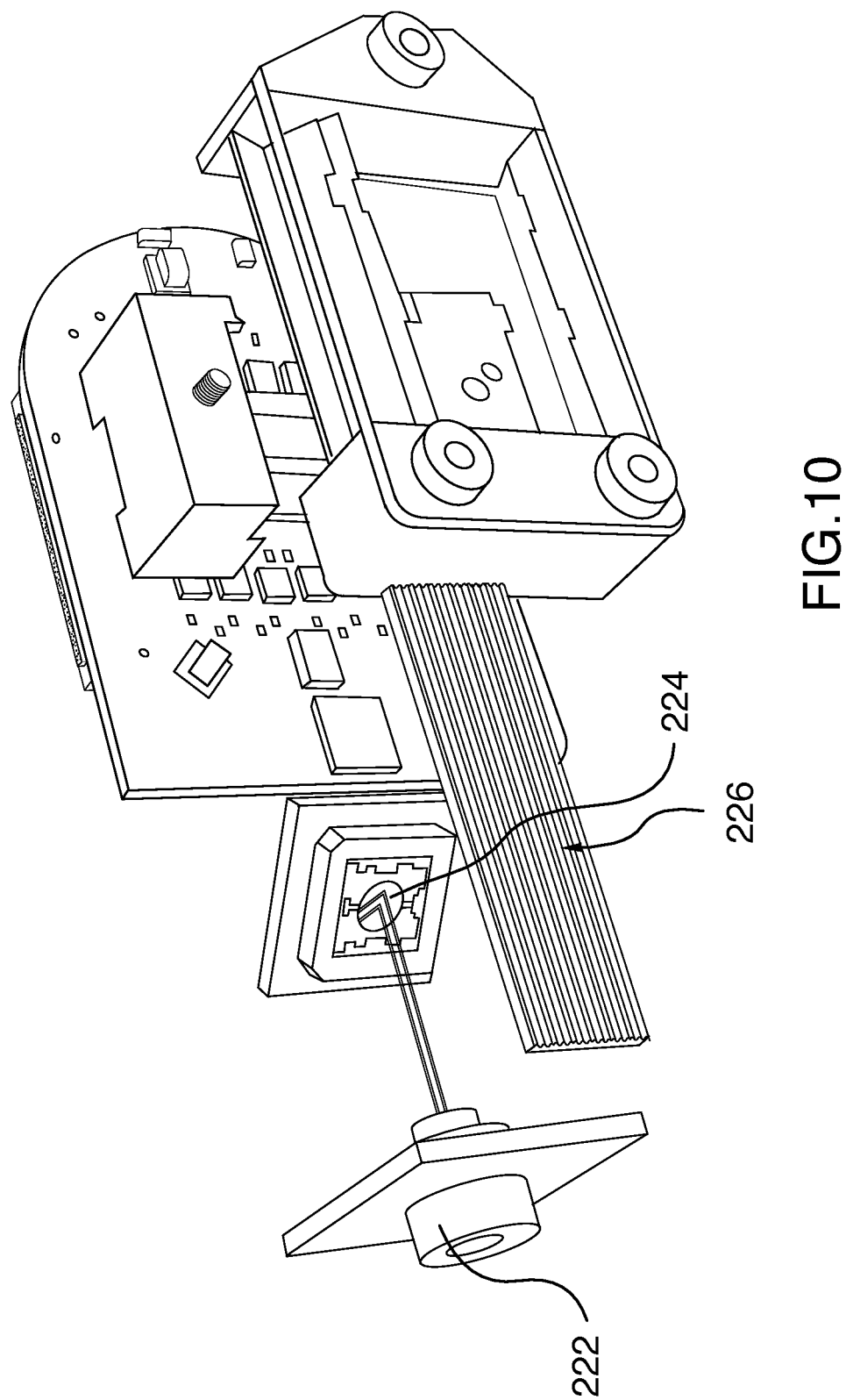
Figure 11:
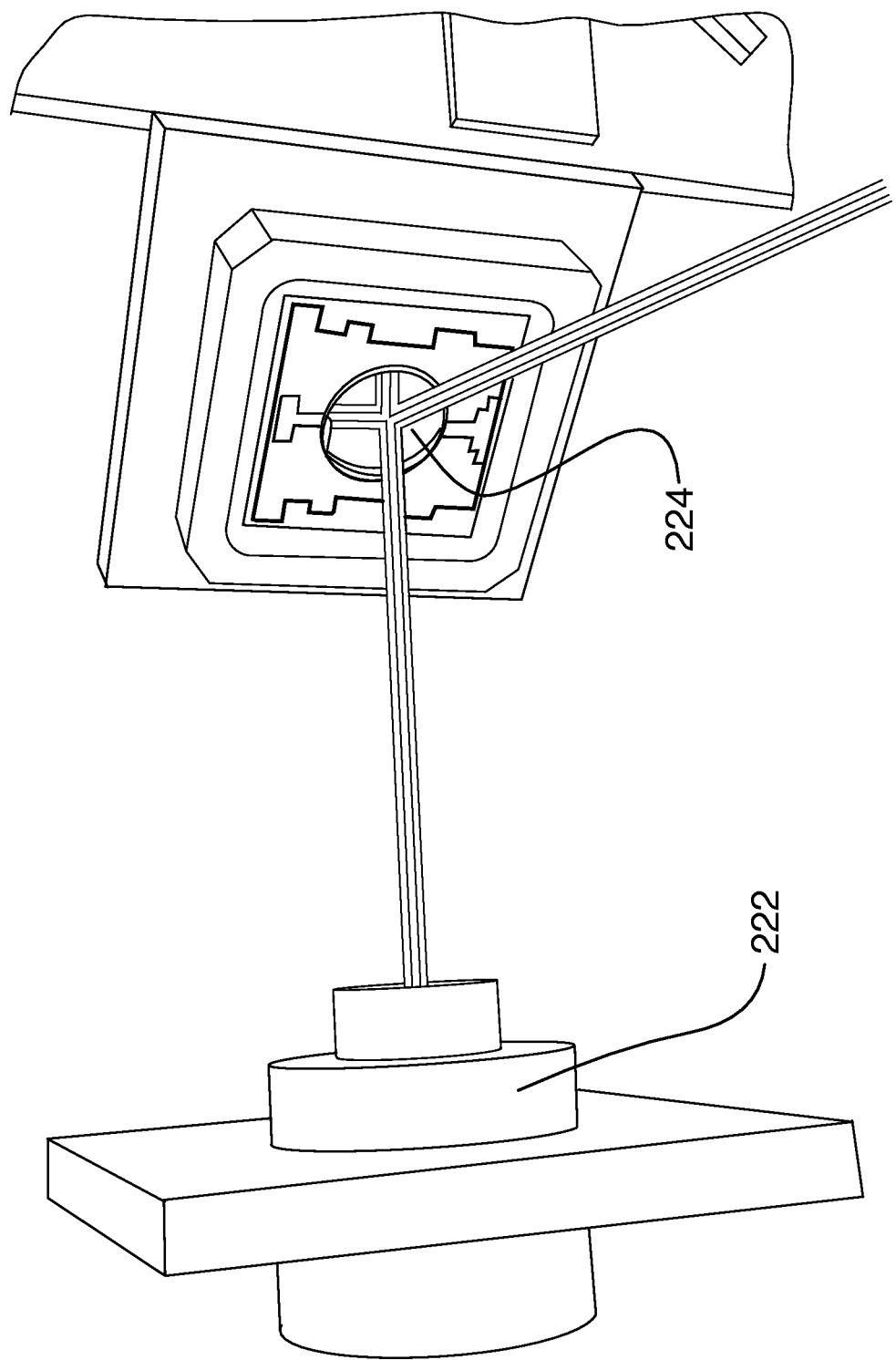
Figure 12:
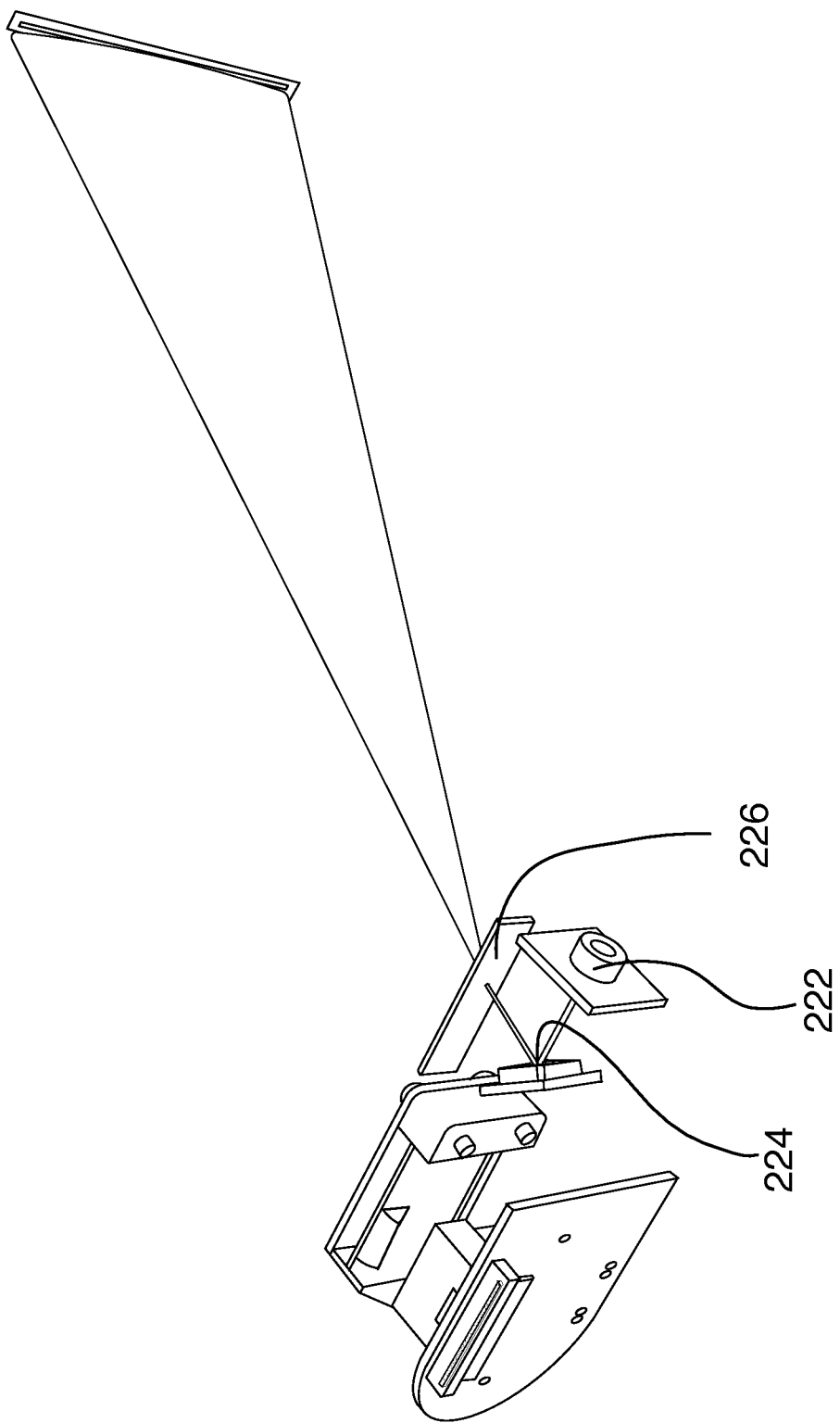

The main components of the emitter side 220 of the 3D scanner are the laser diode 222, the MEMS micro-mirror 224 and the diffuser lens 226. FIG. 10 shows an example laser diode 222 which may include a collimating lens and which pulses a collimated laser beam that is directed towards the oscillating micro-mirror. FIG. 11 shows an example micro-mirror which oscillates at a very high frequency on a single axis. FIG. 12 shows a representation of the diffused laser beam after its passage through the example diffuser lens 226.

The laser diode 222 pulses the collimated laser beam 228 at a mean frequency. This frequency is adapted to the frequency of the MEMS micro-mirror 224. In one example embodiment, the mean frequency is 55.7 kHz. The laser beam 228 is pulsed a number of times during one cycle of resonance of the MEMS micro-mirror 224. The MEMS micro-mirror 224 has a resonance frequency and oscillates on one axis creating a vertical or horizontal pattern of light 230. In one example embodiment, the pattern is vertical. The diffuser lens 226 diffuses the collimated laser beam to create the diffused beam 232. In an example embodiment, the beam is originally a 0.25×0.25 beam and the diffuser lens diffuses the beam by 20 degrees to obtain a 0.25×20 degree beam.

Figure 13:
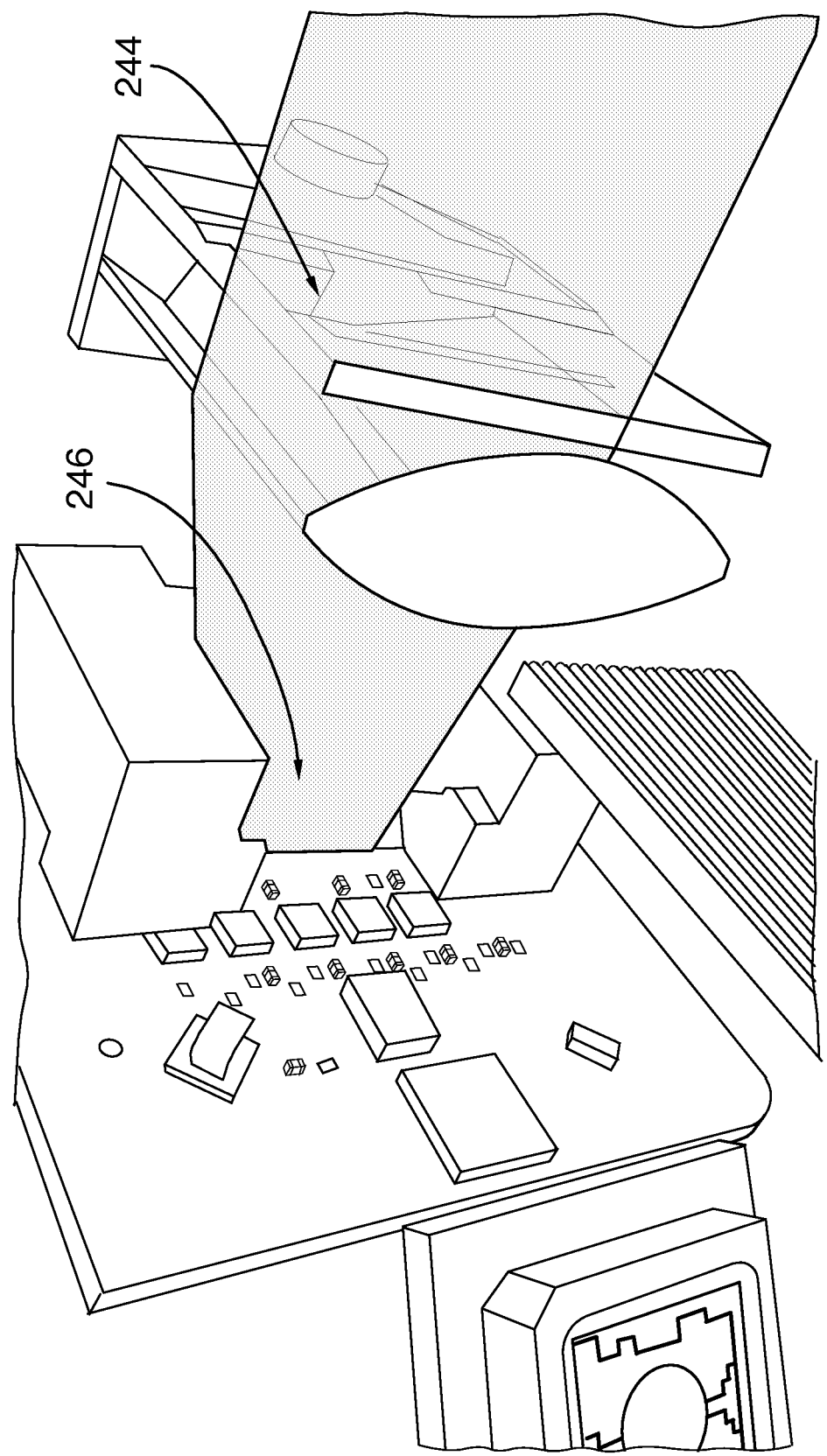
Figure 14:
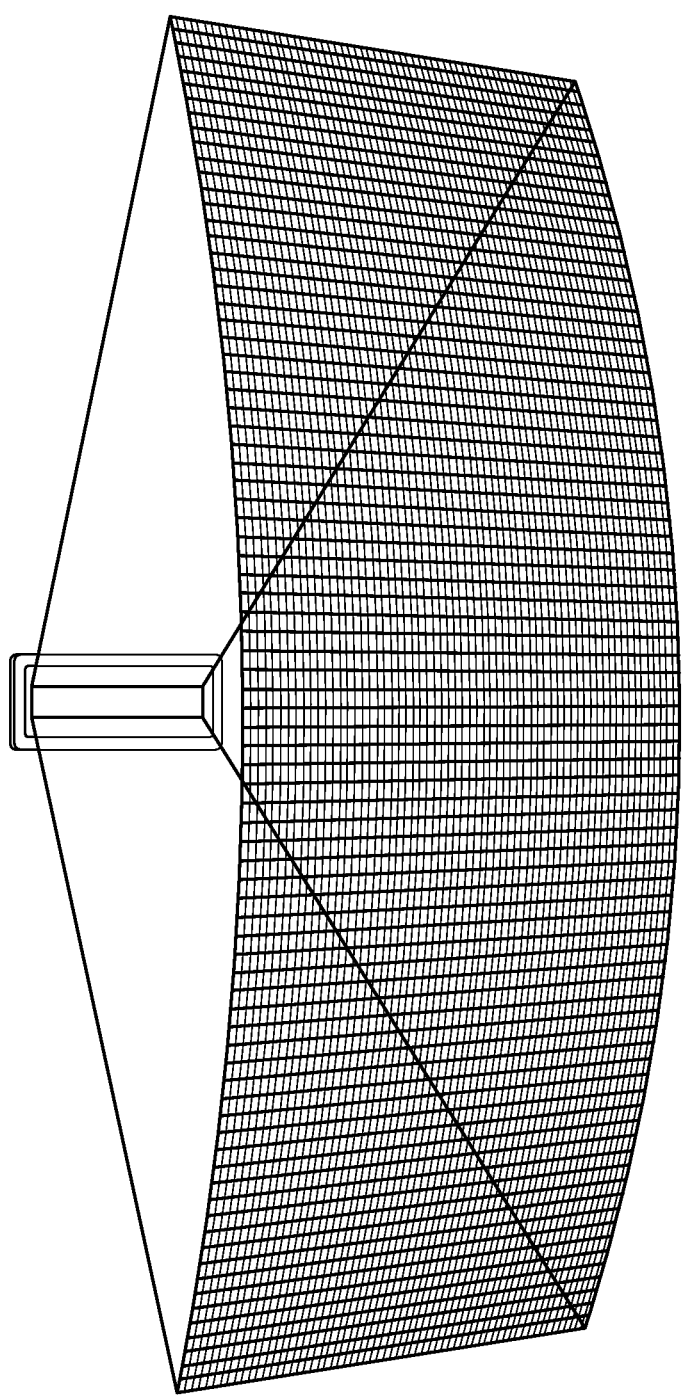
FIG. 14 illustrates the segmentation by a detector array of a vertical signal into multiple individual measurements to build a 3D matrix, in accordance with an embodiment.

The main components of the receiver 240 side of the 3D scanner are the receiver lens 244 and photodetectors 246, such as an APD array (avalanche photodiode). FIG. 13 shows an example of receiver lens 244 which captures light. The receiver lens 244 focuses the reflected light beam on the APD array 246. The array APD 246 is stimulated by the received light. FIG. 14 shows how the example APD array 246 segments each vertical signal in multiple individual measurements to build a 3D matrix.

Figure 20A:
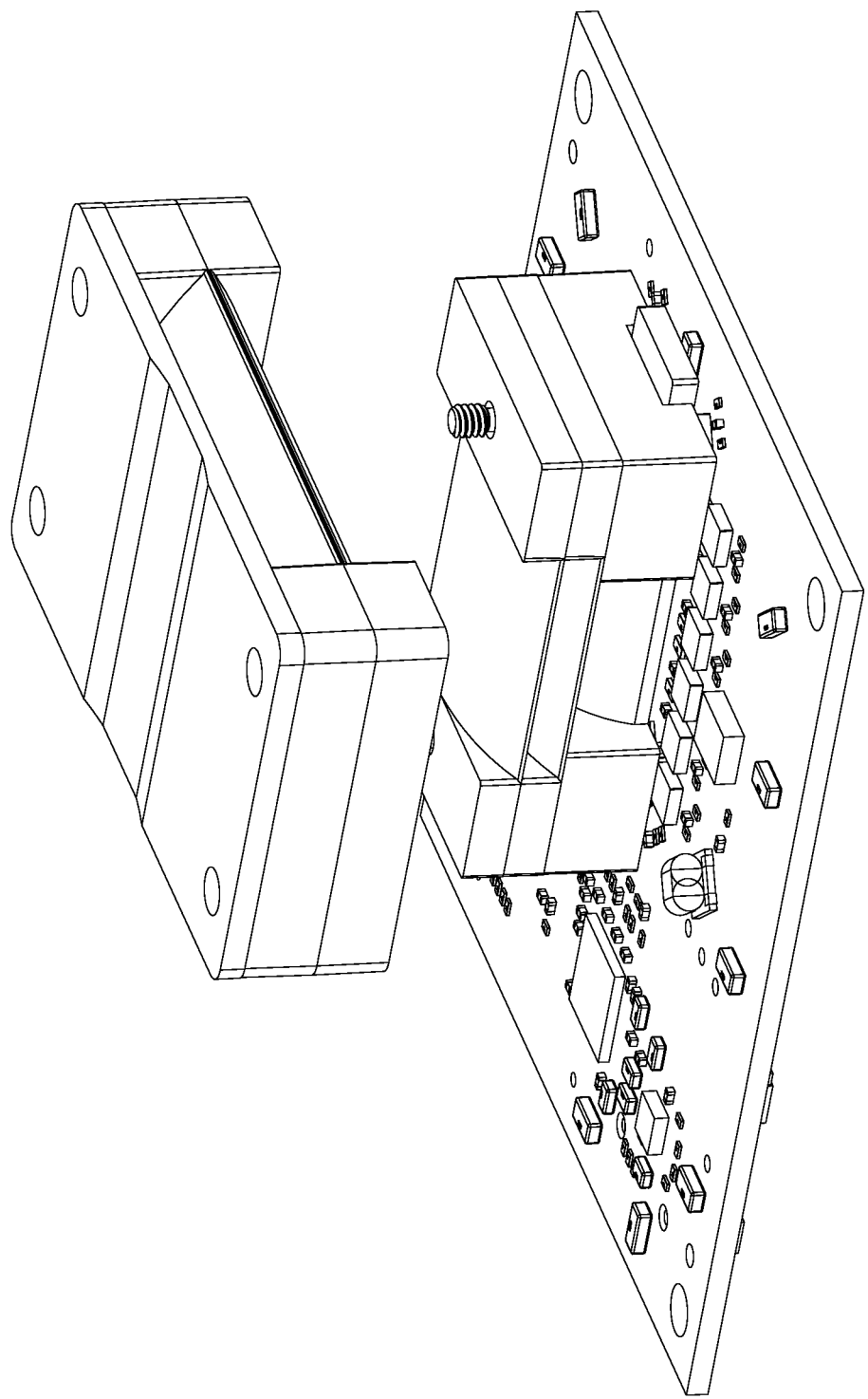
FIG. 20A is a perspective view of an anamorphic lens, in accordance with the prior art.
Figure 20B:
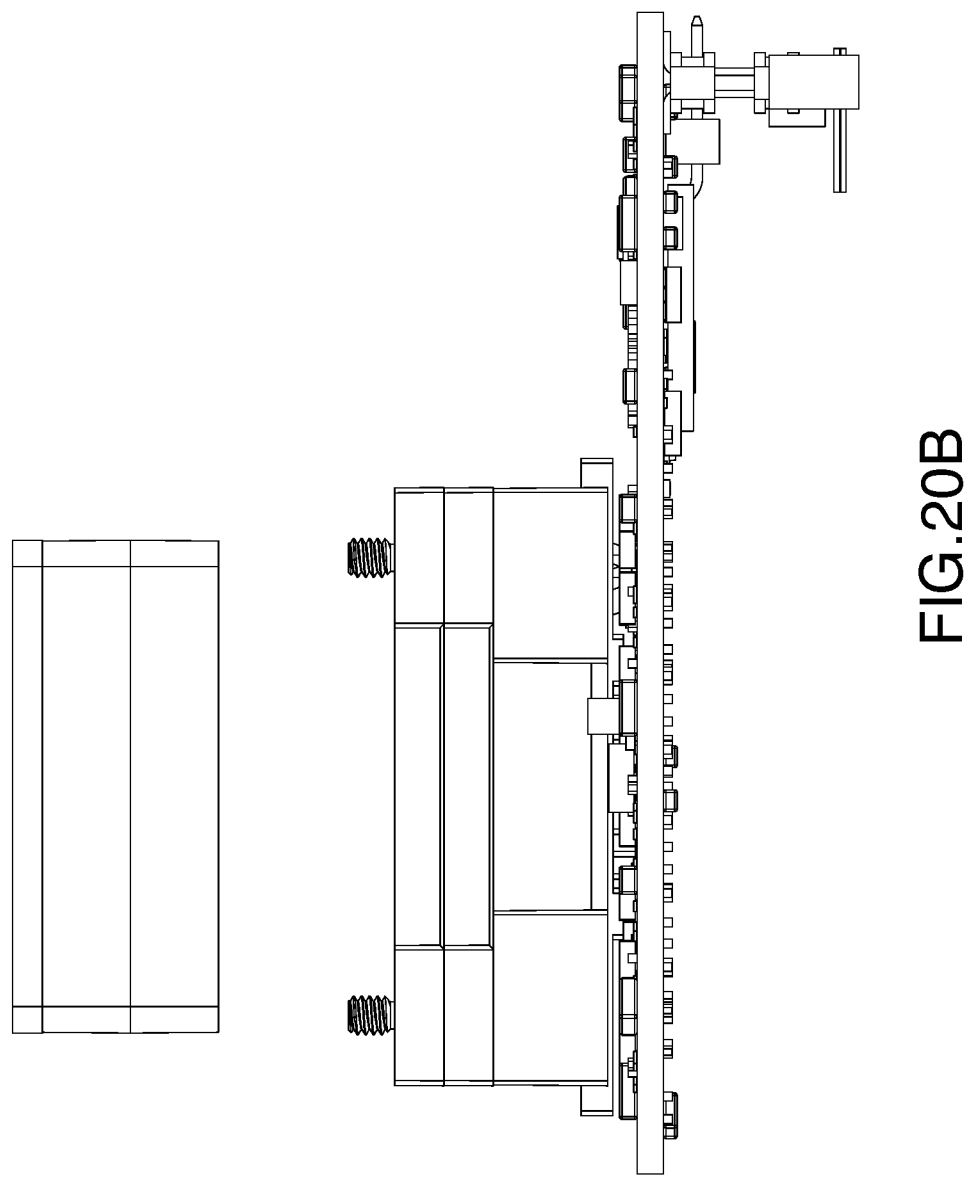

FIG. 20 shows an example anamorphic lens (FIG. 20A) with its parallel (FIG. 20B) and perpendicular (FIG. 20C) views. The anamorphic lens is used to compress or expand the field of view such that the resulting field of view is not uniquely function of the form factor of the sensor. It can be used as receiver lens 244.

In use, the laser diode 222 pulses a collimated laser beam 228 that is directed towards the micro-mirror 224. The collimated laser beam 228 reaches the MEMS micro-mirror 224 and it is redirected by the mirror towards the diffuser lens 226. The collimated laser beam 230 reaches the diffuser lens 226 which diffuses the laser beam. When the diffused laser beam 232 reaches an object, this object reflects the light. The reflected light is then received by the receiver lens 244. The receiver lens 244 redirects the light to the array photodiode 246. Each pixel of the array sends the information to the corresponding output port generating a pixel line. If a 64 element array photodiode is used, a 64 pixel line is created. In order to complete the matrix, this sequence is executed multiple times at different angles of the micro-mirror 224. In an example embodiment, the sequence is repeated 256 times, one sequence at each of 256 different angles of the micro-mirror 224. A 256×64 matrix is then created. The MEMS micro-mirror 224 is operated in resonance and has a quasi-sinusoidal trajectory. It oscillates on one axis allowing to sweep the horizontal or vertical plane. In an example embodiment, the plane is swept horizontally from −30 degrees to +30 degrees. In another embodiment, the plane is swept from −15 degrees to +15 degrees.

The pulse of the laser diode 222 is synchronized with the resonance cycle of the micro-mirror 224. Since the micro-mirror 224 has a frequency that is higher than the frame rate, more than one cycle of resonance is required to complete the multiple acquisitions. During one example cycle of resonance, the laser beam is pulsed 32 times.

Figure 24:
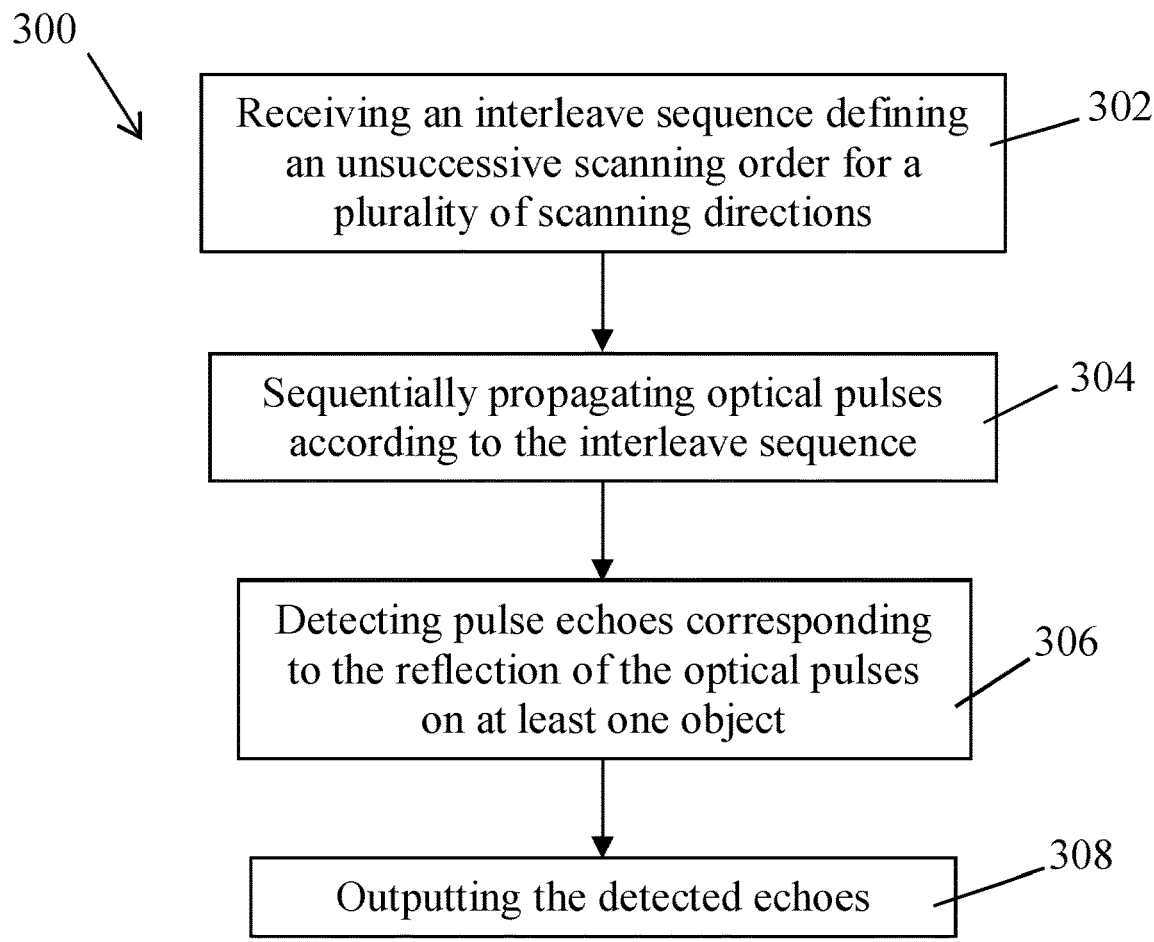
FIG. 24 is a flow chart of a method for scanning a region according to an interleave sequence of scanning directions, in accordance with an embodiment.

FIG. 24 illustrates one embodiment of a method 300 for optically scanning a region which may contain objects to be detected. The method is implemented by an optical system comprising a pulsed light source, a photodetector and a controller, such as a lidar optical rangefinder. The controller comprises a control unit such as a microprocessor, a memory for storing data and a communication unit for receiving and/or transmitting data.

At step 302, an interleave sequence of scanning directions is received. A scanning direction refers to a direction along which an optical pulse is to be emitted. It should be understood that the pulsed light source is adapted to vary the direction along which it emits optical pulses as described in further detail below. The region to be scanned is divided into a plurality of sub-regions which each correspond to the field of view of the optical system when a pulse is emitted along a corresponding scanning direction. The optical system is further adapted to vary the scanning direction so that a given number of discrete scanning directions is necessary for covering the region to be scanned. As a result, the optical system is adapted to emit a light pulse sequentially along a plurality of different scanning directions and a respective field of view corresponds to each scanning direction.

In the prior art, the sub-regions are successively scanned by successively varying the scanning directions from the leftmost direction to the rightmost direction or vice-versa. For example, the pulsed light source is positioned so as to emit a first light pulse along the left most direction. Then the direction of the pulsed light source is varied so that the second optical pulse is emitted along the second scanning direction which is the first direction adjacent to the right of the first scanning direction. Then, the direction of the pulsed light source is varied so that the third optical pulse is emitted along the third scanning direction which is the first direction adjacent to the right of the second scanning direction. These steps are repeated until an optical light pulse is emitted along the rightmost scanning direction. Therefore, according to the prior art, the scanning directions are scanned successively according to an ascending order from the leftmost direction towards the right most scanning direction, or from the right most scanning direction towards the leftmost scanning direction.

Contrary to the prior art, the interleave sequence of scanning directions received at step 302 does not define for the scanning directions in an ascending order from the leftmost direction towards the right most scanning direction, or from the right most scanning direction towards the leftmost scanning direction, as better explained below.

Referring back to FIG. 24, optical pulses are sequentially emitted by the optical system according to the scanning positions listed in the interleave sequence at step 304. The first optical pulse is emitted according to the scanning direction occupying the first position in the interleave sequence. Then the second optical pulse is emitted according to the scanning direction occupying the second position in the interleave sequence, etc. until an optical pulse is emitted according to the scanning direction occupying the last position of the interleave sequence.

At step 306, the pulse echoes are detected by the optical system, i.e., the intensity or amplitude in time for each pulse echo is sensed and measured. The pulse echoes correspond to the reflection of the emitted pulses on objects present within the scanned region. In an embodiment in which the optical system is a full-waveform LIDAR rangefinder, a pulse echo for a given emitted pulse corresponds to the light detected during the period of time comprised between the time at which the given emitted pulse is emitted and the time at which a subsequent pulse is emitted.

At step 308, the detected pulse echoes are outputted, i.e., the detected light intensity or amplitude of the pulse echoes as a function of time is outputted. For example, the detected pulse echoes may be stored in memory. In one embodiment, an identification of the scanning direction corresponding to a detected pulse echoes is outputted along with the pulse echo.

Figure 25:
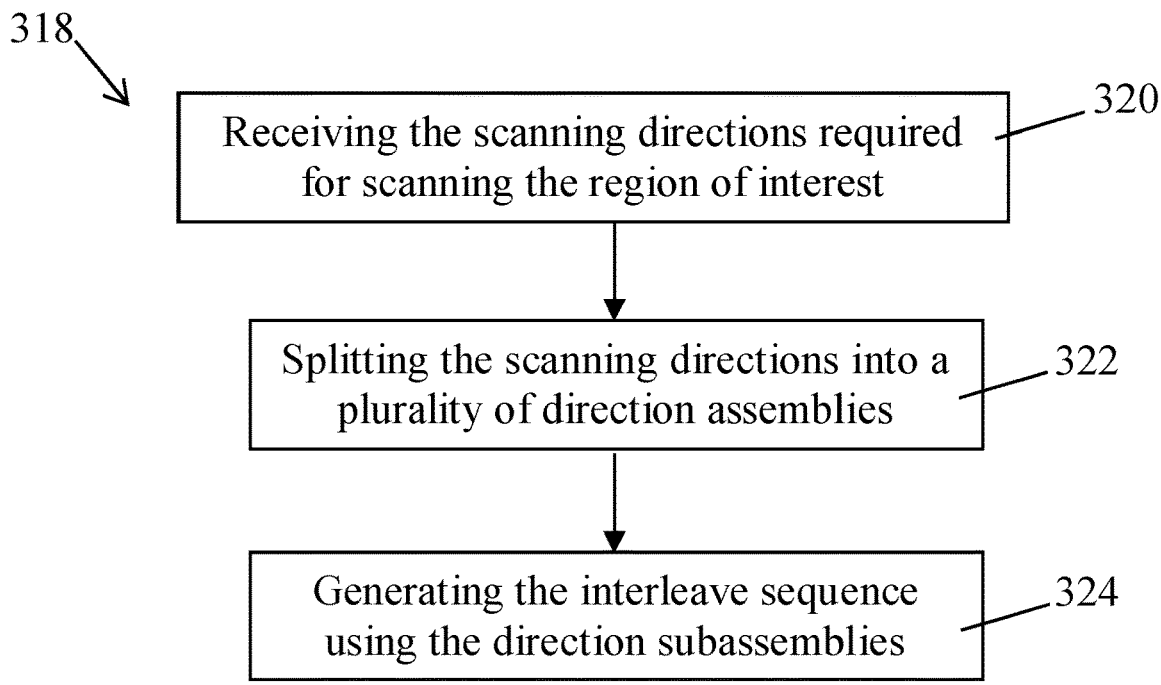
FIG. 25 is a flow chart of a method for creating an interleave sequence of scanning directions, in accordance with an embodiment.

FIG. 25 illustrates one embodiment of a method 318 for generating an interleave sequence. It should be understood that the method 318 may be performed by the controller of the optical system. Alternatively, the interleave sequence may be generated by a computer machine independent from the optical system and subsequently transmitted to the optical system.

At step 320, the scanning directions required to scan the region of interest are received. For example, N scanning directions $d_1, d_2, d_3, \ldots, d_N$ may be received at step 320, where N is the total number of scanning directions.

At step 322, the received scanning directions are split into a plurality of S subassemblies of directions $SUB_1, SUB_2, \ldots, SUB_S$, where S is the number of direction subassemblies. Each subassembly $SUB_j$ comprises a given number $n_j$ of scanning directions chosen from the received scanning directions and therefore corresponds to an ordered list of directions selected from the received scanning directions.

In one embodiment, the direction subassemblies all contain an equal number of directions so that $n_j$ is constant throughout the subassemblies so that:

$n_1 = n_2 = \ldots = n_S = n$.

In this case, N=n*S. In another embodiment, the number of directions contained in a subassembly may vary from one subassembly to another.

In one embodiment, a same received scanning direction may be contained in at least two different subassemblies. In another embodiment, a received scanning direction may be assigned to a single subassembly so that two different subassemblies cannot contain a same received scanning direction.

At step 324, the interleave sequence IS is created using the direction subassemblies $SUB_j$.

In the case where all of the subassemblies contain an equal number n of directions, the interleave sequence IS may be expressed as follows:

IS=[$SUB_1(1)$, $SUB_2(1)$, ..., $SUB_S(1)$, $SUB_1(2)$, ..., $SUB_2(2)$, ..., $SUB_S(2)$, ..., $SUB_1(n)$, $SUB_2(n)$, ..., $SUB_S(n)$]

where:
$SUB_1$=[$SUB_1(1)$, $SUB_1(2)$, ..., $SUB_S(n)$]
$SUB_2$=[$SUB_2(1)$, $SUB_2(2)$, ..., $SUB_2(n)$], etc.
$SUB_S$=[$SUB_S(1)$, $SUB_S(2)$, $SUB_S(n)$], and
$SUB_j(i)$ corresponds to a given one of the scanning directions received at step 320.

In one embodiment, the method 300 further comprises a step of determining the scanning directions as a function of the region of interest to be scanned. In this case, the method 300 comprises a step of receiving the region of interest. For example, the region of interest may be defined as an initial range of angles such as [−30 degrees, +30 degrees] and the initial range of angles may be divided by a number of scanning directions which may be predefined or received when inputted by a user to obtain a plurality of sub-range of angles, each being associated with a respective scanning direction. For example, each scanning direction may be located at the center of a respective sub-range of angles.

It should be understood that any adequate method for generating scanning directions to scan a region of interest may be used. While in the above example the number of scanning directions is predefined, other scenarios may be possible. For example, the angular distance between two successive scanning directions may be predefined.

Figure 26:
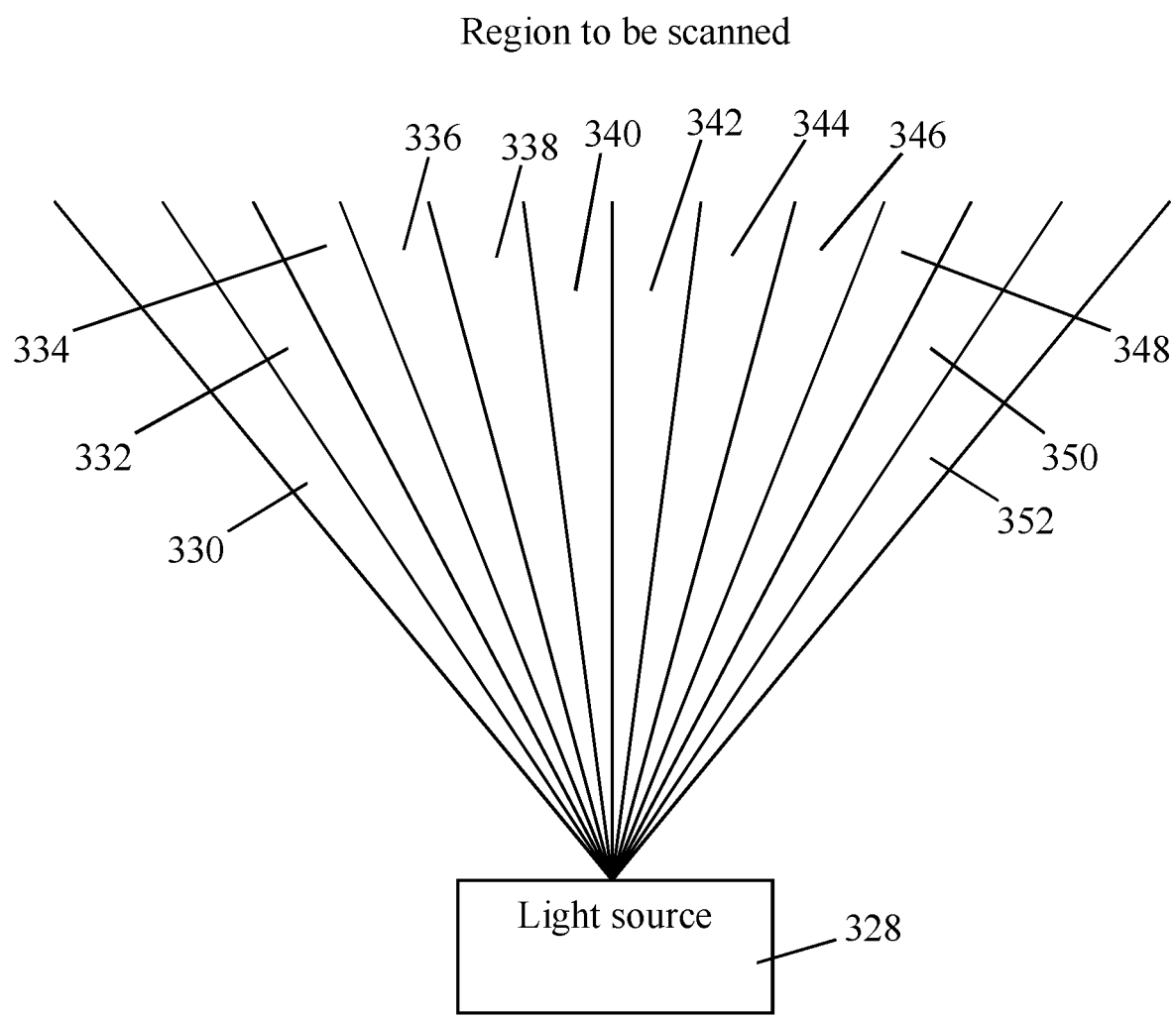
FIG. 26 illustrates a plurality of field-of-views for a pulsed light source, in accordance with an embodiment.

FIG. 26 illustrates a scenario in which optical pulses are to be emitted by a pulsed light source 328 according to 12 different scanning directions $d_1, \ldots, d_{12}$ in order to optically scan a region of interest. Each one of the 12 scanning directions $d_1, \ldots, d_{12}$ is associated with a respective field of view 330, ..., 352.

Figure 15:
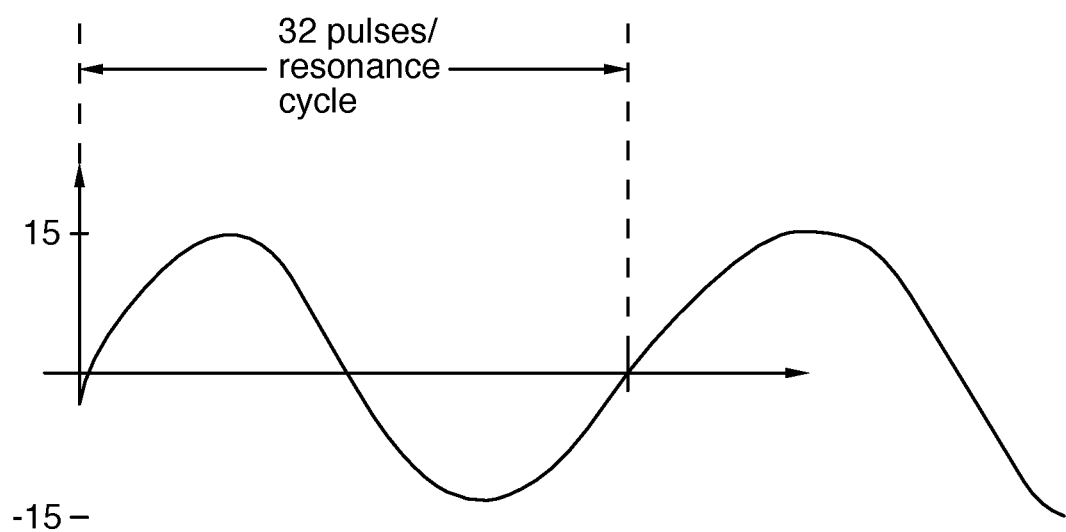
FIG. 15 illustrates a cycle of rotation for a micro-mirror, in accordance with an embodiment.
Figure 19:
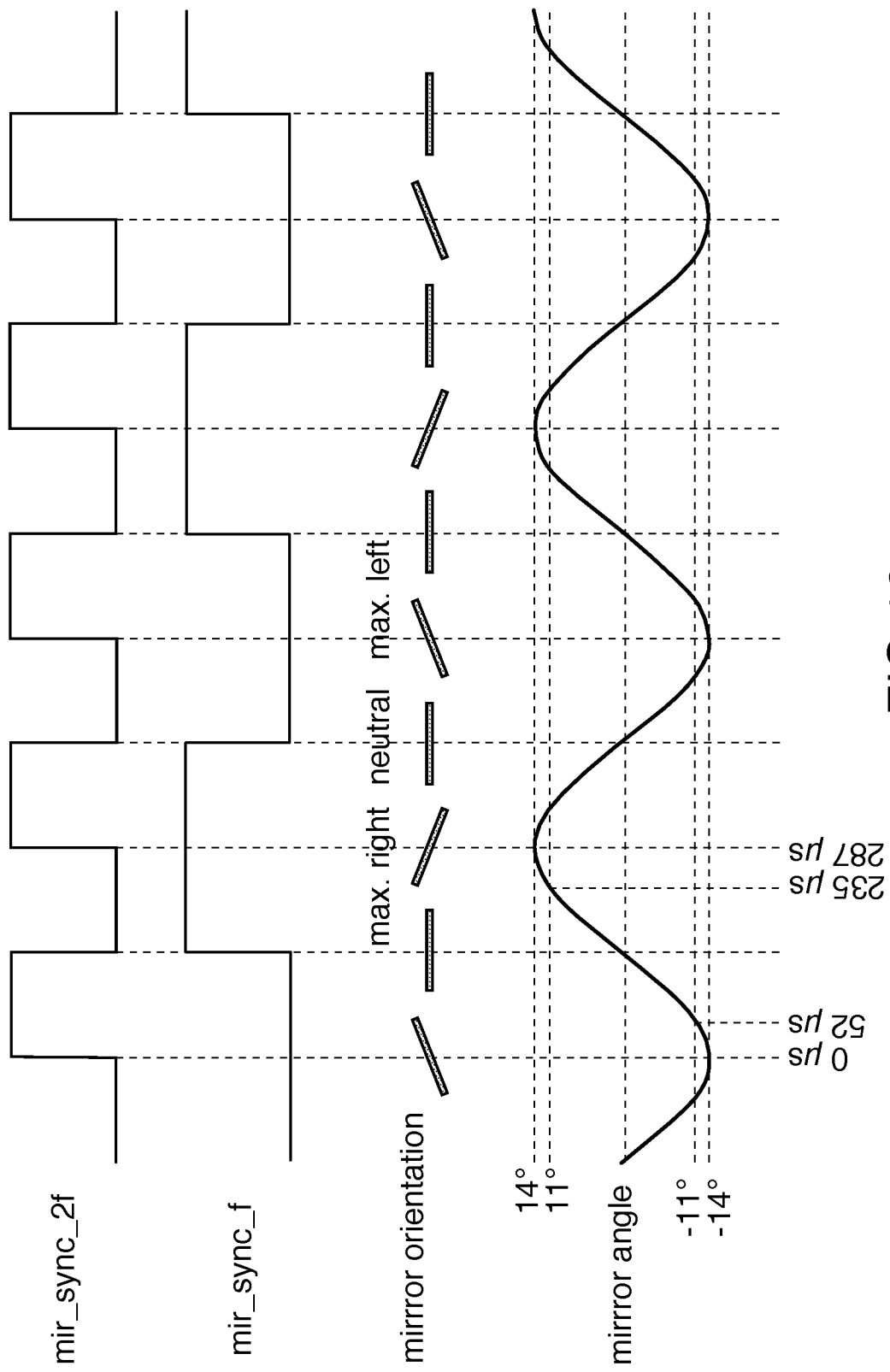
FIG. 19 illustrates the cycle of rotation of a micro-mirror according to two synchronization signals, in accordance with an embodiment

It should be understood that any adequate pulsed light source adapted to vary the direction of emission of the optical pulses may be used. For example, the pulsed light source 328 may be motorized and rotatable so as to vary the scanning direction. In one example, the pulsed light source 328 may comprise a motorized rotation stage. In another example, the pulsed light source 328 may comprise at least one motorized and rotatable mirror for varying the scanning direction. In a further embodiment, the optical system comprising the pulsed light source 328 may correspond to the rangefinder illustrated in FIG. 8 so that the pulsed light source 328 comprises a MEMS micro-mirror operated in a resonant mode for varying the scanning direction. FIG. 15 illustrates an exemplary resonance cycle of angular position or orientation for a micro-mirror operated in resonance. The resonance cycle comprises a first half-cycle during which the micro-mirror rotates from a first extreme angular position or orientation to a second extreme angular position or orientation, and a second half cycle during which the micro-mirror rotates from the second extreme angular position or orientation back to the first extreme angular position or orientation. In this exemplary cycle, 32 optical pulses may be reflected by the micro-mirror during a single resonance cycle. FIG. 19 shows an example mirror synchronization signal graph for an oscillation between −14 degrees and +14 degrees. Two synchronization signals are used to determine the exact orientation of the micro-mirror, as known in the art. In one embodiment, The mirror frequency in example embodiments is comprised between about 1300 Hz and about 1750 Hz.

According to the prior art, optical pulses would be iteratively and successively emitted according to an ascending order of scanning direction. In an example in which the ascending order is from the leftmost to the rightmost, a first pulse would be emitted when the scanning direction of the light source 328 corresponds to the scanning direction $d_1$ of the leftmost field of view 330. For example, the scanning direction $d_1$ may be centered within the field of view 330. Then a second optical pulse would be emitted when the axis of the pulsed light source 328 would be oriented according to a second direction $d_2$ corresponding to the field of view 332, a third optical pulse would be emitted when the axis of the pulsed light source 328 would be oriented according to a third direction $d_3$ corresponding to the field of view 334, etc. until an optical pulse is emitted when the axis of the pulsed light source 328 would be oriented along a twelfth direction $d_{12}$ corresponding to the rightmost field of view 352. A resonant mirror may be used for varying the direction of emission of the optical pulses and the pulse rate of the pulsed light source is adjusted so that a pulse be emitted for each scanning direction $d_1, \ldots, d_{12}$ while the mirror rotates from its leftmost angular position corresponding to the direction $d_1$ to its rightmost direction corresponding to the direction $d_{12}$.

According to the present method and contrary to the prior art method, the optical pulses are not emitted according to an ascending order of scanning directions, but according to an interleave sequence of scanning directions.

For example, three subassemblies of directions may be created as follows:
$SUB_1=[d_1, d_2, d_3, d_4]$
$SUB_2=[d_5, d_6, d_7, d_8]$
$SUB_3=[d_9, d_{10}, d_{11}, d_{12}]$ In this case, the interleave sequence IS is as follows:
$IS=[d_1, d_5, d_9, d_2, d_6, d_{10}, d_3, d_7, d_{11}, d_4, d_8, d_{12}]$.

Referring back to the example in which a resonant mirror is used for adjusting the direction and in comparison to the above described prior art method, the time between the emission of two pulses is greater assuming the operation of the resonant mirror is the same, e.g. same rotation speed. While in the prior art a second pulse is emitted when the mirror is oriented according to the second direction $d_2$, the second pulse is emitted only when the mirror is oriented according to the fifth direction $d_5$ according to the present method. Since it takes more time for the mirror to rotate from the first direction $d_1$ to the fifth direction $d_5$ than from the first direction $d_1$ to the second direction $d_2$, the time for detecting echoes is increased in comparison to the prior art and therefore the range of non-ambiguous detection of objects is also increased with respect to the prior art. However, the present method requires more time to scan the whole region in comparison to the prior art method since it takes four rotations of the mirror from its leftmost position to its rightmost position to scan the 12 directions while a single rotation of the mirror from its leftmost angular position to its rightmost angular position is required for scanning the 12 directions according to the prior art method.

In one embodiment of the present method and as described above, the optical pulses are emitted only during one half-cycle of the rotation of the mirror, i.e., while the mirror rotates from its leftmost angular position to its rightmost angular position or vice versa. FIG. 15.

In another embodiment, the optical pulses are emitted during the whole cycle of rotation of the mirror, i.e., when the mirror rotates from its leftmost angular position to its rightmost angular position and when it rotates from its rightmost angular position to its leftmost angular position.

Referring to the previous example illustrated at FIG. 26, the three following subassemblies may be created when optical pulses are to be emitted during the two full cycles of resonance of the micro-mirror:
$SUB_1=[d_4, d_{10}, d_3, d_9]$
$SUB_2=[d_8, d_6, d_7, d_5]$
$SUB_3=[d_{12}, d_2, d_{11}, d_1]$ In this case, the interleave sequence IS is as follows:
$IS=[d_4, d_8, d_{12}, d_{10}, d_6, d_2, d_3, d_7, d_{11}, d_9, d_5, d_1]$.

The directions $d_4, d_8, d_{12}$ are achieved during a first half-cycle of rotation of the mirror, i.e., when the mirror rotates from its leftmost angular position to its rightmost angular position, while the directions $d_{10}, d_6, d_2$ are achieved during the next half-cycle of rotation of the mirror, i.e., when the mirror rotates from its rightmost angular position to its leftmost angular position. Therefore, six directions can be scanned during a first full cycle of rotation of the mirror. The directions $d_3, d_7, d_{11}$ are achieved during a third half-cycle of rotation of the mirror, i.e., when the mirror rotates from its leftmost angular position to its rightmost angular position, while the directions $d_9, d_5, d_1$ are achieved during a fourth half-cycle of rotation of the mirror, i.e., when the mirror rotates from its rightmost angular position to its leftmost angular position. Therefore, six additional directions can be scanned during a second full cycle of rotation of the mirror and the 12 directions can be scanned in only two full cycles of rotation of the motor.

In one embodiment, the optical system is a full-waveform LIDAR instrument as described above and at least two pulses are emitted per scanning direction.

In an embodiment in which a plurality of optical pulses are to be emitted for each scanning direction, per measurement, the interleave sequence may be iteratively executed a given number of times corresponding to the number of optical pulses to be emitted per scanning direction. In this case, a first optical pulse is emitted for each scanning direction according to the order defined by the interleave sequence. Then, a second optical pulse is emitted for each scanning direction also according to the interleave sequence, etc. until the given number of optical pulses per scanning direction is emitted.

Figure 18:
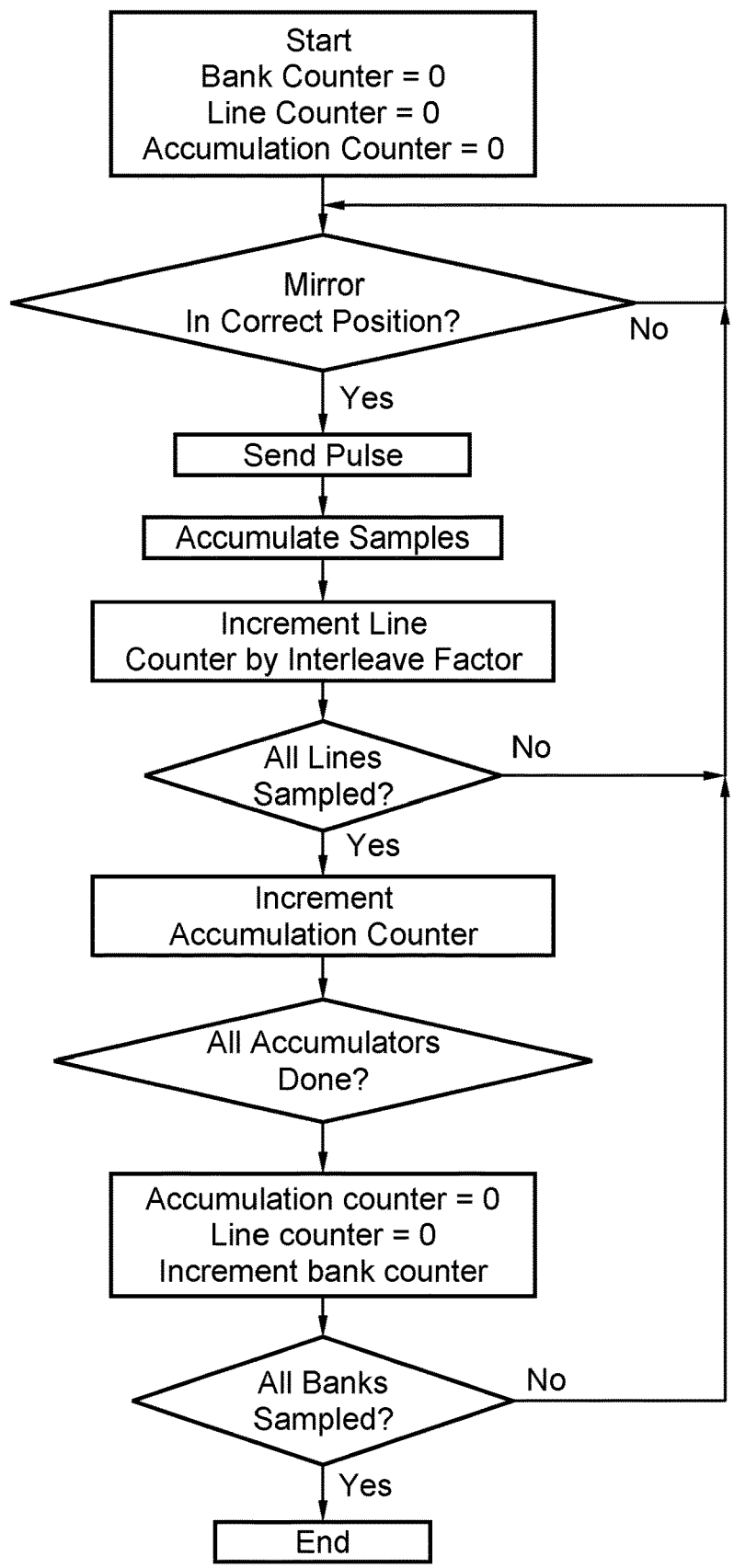
FIG. 18 is a flow chart of a method for a plurality of emitting optical pulses per scanning direction in which an interleave sequence of scanning directions is divided into a plurality of subsequences, in accordance with an embodiment.

In another embodiment in which a plurality of optical pulses are to be emitted for each scanning direction during one measurement, the interleave sequence may be divided into a plurality of interleave sub-sequences which are executed a given number of times corresponding to the number of optical pulses to be emitted per scanning direction. In this case, the first interleave sub-sequence is executed the given number of times, then the second interleave sub-sequence is executed the given number of times, etc., as illustrated by the exemplary flow chart of FIG. 18. In this exemplary method, the first step consists in setting all parameters to zero. The position of the micro-mirror is checked. If the micro-mirror is not in its initial predefined position, the position of the micro-mirror is adjusted. If the position of the micro-mirror is correct, a first pulse is emitted according to the first scanning direction defined in a first bank or scanning direction subassembly. Then a second pulse is emitted according to the second scanning direction defined in the first bank of scanning directions, a third pulse is emitted according to the third scanning direction defined in the first bank of scanning directions, etc. until all of the scanning directions defined in the first bank have been scanned once, i.e., until a first pulse has been sequentially transmitted according to each scanning direction contained in the first bank. Then these steps, i.e., the sequential scanning of all of the scanning directions contained in the first bank, are repeated a given number of times until a desired number of samples is reached.

Once all of the lines or scanning directions of the first bank have been scanned a given number of times to obtain the desired number of samples, the bank counter is incremented and the scanning directions of the second bank are scanned. A first pulse is emitted according to the first scanning direction defined in the second bank or scanning direction subassembly. Then a pulse is emitted according to the second scanning direction defined in the second bank of scanning directions, a further pulse is emitted according to the third scanning direction defined in the second bank of scanning directions, etc. until all of the scanning directions defined in the second bank have been scanned once, i.e., until a first pulse has been sequentially transmitted according to each scanning direction contained in the second bank. Then these steps, i.e., the sequential scanning of all of the scanning directions contained in the second bank, are repeated a given number of times until a desired number of samples is reached.

The above-described steps are repeated until all of the banks of scanning directions have been scanned.

In one embodiment, an interleave sequence may comprise scanning directions to be executed during a half-cycle of rotation of the micro-mirror or during a complete cycle of rotation of the micro-mirror.

For example, the interleave sequence may be as follows:
IS=$[d_1, d_5, d_9, d_2, d_6, d_{10}, d_3, d_7, d_{11}, d_4, d_8, d_{12}]$.

For example, the interleave sequence may comprise four interleave sub-sequences each comprising scanning directions to be scanned during a half-cycle of rotation of the micro-mirror, as follows:
$ISS_1=[d_1, d_5, d_9]$
$ISS_2=[d_2, d_6, d_{10}]$
$ISS_3=[d_3, d_7, d_{11}]$
$ISS_4=[d_4, d_8, d_{12}]$ In this case, the first interleave sub-sequence $ISS_1$ is first executed a given number of times which corresponds to the number of optical pulses to be emitted per scanning direction and per measurement. Then the second interleave sub-sequence $ISS_2$ is executed the given number of times before the third interleave sub-sequence $ISS_3$ is executed the given number of times. Finally, the fourth interleave sub-sequence $ISS_4$ is executed the given number of times.

For example, if three optical pulses are to be emitted along each scanning direction during one measurement, the first interleave sub-sequence $ISS_1$ is first executed three times, i.e., three optical pulses are iteratively emitted along the scanning directions $d_1$, $d_5$ and $d_9$ during each one of three consecutive half-cycles of rotation of the micro-mirror, i.e., a first optical pulse is emitted along each one of the directions $d_1$, $d_5$ and $d_9$ during a first half-cycle of rotation of the micro-mirror, then a second optical pulse is emitted along each one of the directions $d_1$, $d_5$ and $d_9$ during a second half-cycle of rotation of the micro-mirror, and a third optical pulse is emitted along each one of the directions $d_1$, $d_5$ and $d_9$ during a third half-cycle of rotation of the micro-mirror.

Then three optical pulses are iteratively emitted along the scanning directions $d_2$, $d_6$, $d_{10}$ during each one of three consecutive half-cycles of rotation of the micro-mirror. Three optical pulses are subsequently and iteratively emitted along the scanning directions $d_3$, $d_7$, $d_{11}$ during each one of three consecutive half-cycles of rotation of the micro-mirror. Finally, three optical pulses are iteratively emitted along the scanning directions $d_4$, $d_8$, $d_{12}$ during each one of three consecutive half-cycles of rotation of the micro-mirror.

In an embodiment in which scanning directions are scanned during a full cycle of rotation of the micro-mirror, the interleave sequence may also be divided into a plurality of interleave sub-sequences which are executed a given number of times corresponding to the number of optical pulses to be emitted per scanning direction. In this case, the first interleave sub-sequence is executed the given number of times, then the second interleave sub-sequence is executed the given number of times, etc. An interleave sequence may comprise scanning directions to be executed during a half-cycle of rotation of the micro-mirror or during a complete cycle of rotation of the micro-mirror.

For example, the interleave sequence may be as follows:
IS=$[d_4, d_8, d_{12}, d_{10}, d_6, d_2, d_3, d_7, d_{11}, d_9, d_5, d_1]$.

For example, the interleave sequence may comprise two interleave sub-sequences each comprising scanning directions to be scanned during a full cycle of rotation of the micro-mirror, as follows:
$ISS_1=[d_4, d_8, d_{12}, d_{10}, d_6, d_2]$
$ISS_2=[d_3, d_7, d_{11}, d_9, d_5, d_1]$ The first interleave sub-sequence is executed a given number of times which corresponds to the number of optical pulses to be emitted per scanning direction and per measurement. Then the second interleave sub-sequence $ISS_2$ is executed the given number of times.

For example, if three optical pulses are to be emitted along each scanning direction during one measurement, the first interleave sub-sequence $ISS_1$ is first executed three times, i.e., three optical pulses are iteratively emitted along the scanning directions $d_4$, $d_8$, $d_{12}$, $d_{10}$, $d_6$, $d_2$ during each one of three consecutive full cycles of rotation of the micro-mirror, i.e., a first optical pulse is emitted along each one of the directions $d_4$, $d_8$, $d_{12}$, $d_{10}$, $d_6$, $d_2$ during a first full cycle of rotation of the micro-mirror, then a second optical pulse is emitted along each one of the directions $d_4$, $d_8$, $d_{12}$, $d_{10}$, $d_6$, $d_2$ during a second full cycle of rotation of the micro-mirror, and a third optical pulse is emitted along each one of the directions $d_4$, $d_8$, $d_{12}$, $d_{10}$, $d_6$, $d_2$ during a third full cycle of rotation of the micro-mirror.

Then three optical pulses are iteratively emitted along the scanning directions $d_3$, $d_7$, $d_{11}$, $d_9$, $d_5$, $d_1$ during each one of three consecutive full cycles of rotation of the micro-mirror.

In an embodiment in which the time required to complete a measurement is fixed, emitting optical pulses according to an interleave sequence of directions may increase the non-ambiguous range of detection but at the expense of the SNR as illustrated in Table 1.

Table 1 illustrates exemplary interleaving configurations for the following example setup: mirror frequency of 1740 Hz, mirror half-period of 0.287 msec, frame rate of 15 Hz, multiplexing at 1:1, and resolution at 256 lines. In this example, all of the subassemblies used for generating an interleave sequence of scanning directions contain an equal number of directions and the oscillation angular range of the mirror may be 60 degrees, i.e., the orientation of the mirror oscillates between −30 degrees and +30 degrees. If the total number of scanning directions is equal to 256, then the angular difference between two successive scanning directions is equal to about 0.24 degree.

The number of banks or interleave factor corresponds to the number of scanning direction subassemblies used for creating the interleave sequence. The resolution refers to the number of scanning directions used for scanning the region of interest. The number of lines per bank corresponds to the number of directions contained in a subassembly of scanning directions. The number of pulses per measurement refers to the number of pulses emitted along a same scanning direction during the time period associated with a measurement. The SNR improvement refers to the improvement of the SNR relative to a scenario in there would be a single pulse per measurement.

In this case, a minimum number of 8 half-cycles is required for scanning the 256 lines (or scanning directions). If optical pulses are to be emitted during the back and forth half-cycles of the oscillation of the mirror, then only 8 half-cycles are necessary for scanning the 256 directions. However, if optical pulses are to be emitted during only one half-cycle per oscillation of the mirror, then 16 full cycles of oscillation of the mirror are required for scanning the 256 directions.

TABLE 1

Examplary interleaving configurations

| Nb of banks (interleave factor) | Nb of lines per banks | Resolution | Pulse Rate (Hz) | Non-ambiguous range (m) | Nb of pulses per measurement | SNR improvement | Frame Rate |
|---|---|---|---|---|---|---|---|
| 1 | 256 | 256 | 890880 | 168.4 | 232 | 15.2 | 15.0 |
| 2 | 128 | 256 | 445440 | 336.7 | 116 | 10.8 | 15.0 |
| 3 | 85 | 255 | 295800 | 507.1 | 77 | 8.8 | 15.1 |
| 4 | 64 | 256 | 222720 | 673.5 | 58 | 7.6 | 15.0 |
| 5 | 51 | 255 | 177480 | 845.2 | 46 | 6.8 | 15.1 |
| 6 | 42 | 252 | 146160 | 1026.3 | 38 | 6.2 | 15.3 |
| 7 | 36 | 252 | 125280 | 1197.3 | 33 | 5.7 | 15.1 |
| 8 | 32 | 256 | 111360 | 1347.0 | 29 | 5.4 | 15.0 |
| 9 | 28 | 252 | 97440 | 1539.4 | 25 | 5.0 | 15.5 |
| 10 | 25 | 250 | 87000 | 1724.1 | 23 | 4.8 | 15.1 |

When the interleaving factor is equal to one, there is no interleaving sequence and the 256 scanning directions are scanned successively from left to right or right to left. This scenario provides the greatest SNR improvement but requires the greatest pulse rate. Therefore, this scenario provides the lowest non-ambiguous range.

When the interleaving factor is equal to two, two subassemblies of scanning directions are created, each containing 128 directions and the total number of scanning directions is equal to 256. For example, the first subassembly $SUB_1$ may contain 128 scanning directions and the second subassembly $SUB_2$ may also contain 128 scanning directions as follows:
$SUB_1=[d_1, d_3, \ldots, d_{255}]$
$SUB_2=[d_2, d_4, \ldots, d_{256}]$ The first and second subassemblies $SUB_1$ and $SUB_2$ are sequentially combined to obtain the following interleave sequence:
$IS=[d_1, d_3, d_5, \ldots, d_{255}, d_2, d_4, \ldots, d_{256}]$.

When the interleaving factor is equal to three, three subassemblies of direction are created, each containing 85 directions and the total number of scanning directions is equal to 255. For example, the first subassembly $SUB_1$, the second subassembly $SUB_2$ and the third subassembly $SUB_3$ may be expressed as follows:
$SUB_1=[d_1, d_4, \ldots, d_{254}]$
$SUB_2=[d_2, d_5, \ldots, d_{255}]$
$SUB_2=[d_3, d_6, \ldots, d_{256}]$ The subassemblies $SUB_1$, $SUB_2$ and $SUB_2$ are sequentially combined to obtain the following interleave sequence:
$IS=[d_1, d_4, \ldots, d_{254}, d_2, d_5, \ldots, d_{255}, \ldots, d_3, d_6, \ldots, d_{256}]$.

Figure 16:
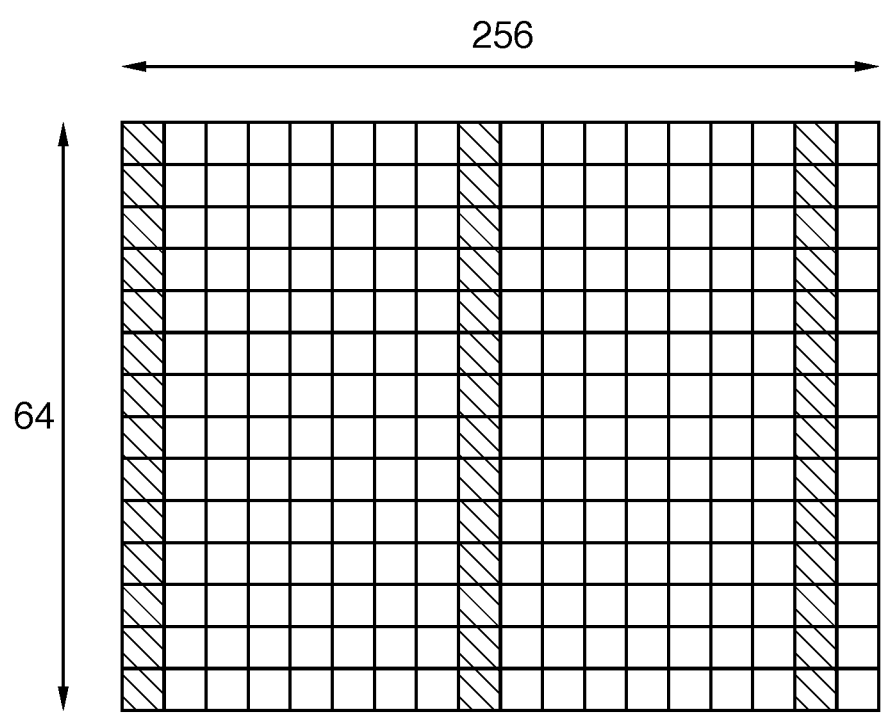
FIGS. 16 and 17 illustrates the generation of an interleave sequence of scanning directions with an interleave factor of 8, in accordance with an embodiment.
Figure 17:
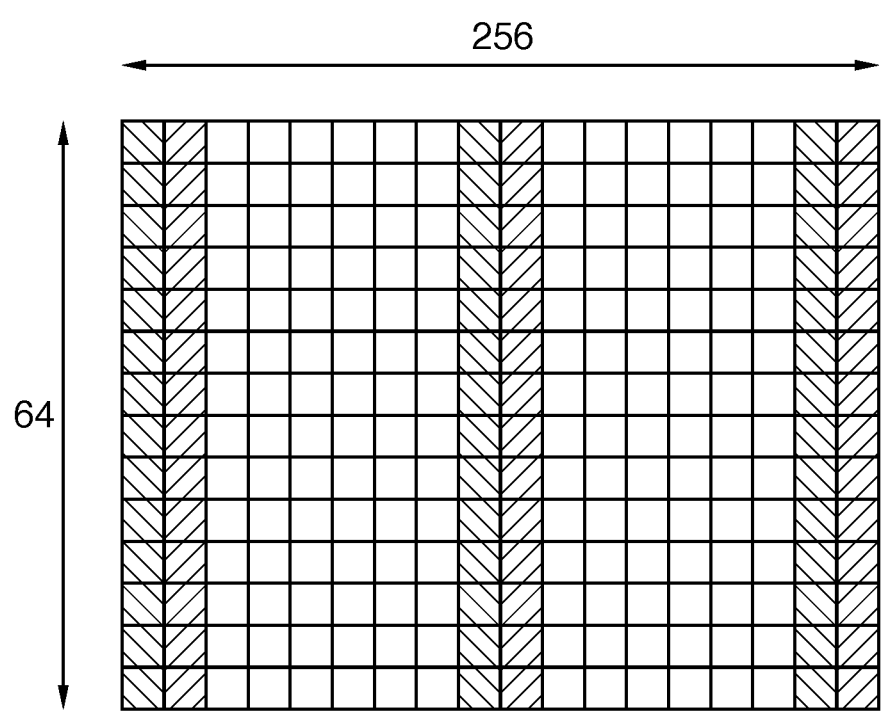

As the interleave factor increases, the same method is used for creating the interleave sequence. For example, FIGS. 16 and 17 illustrates a scenario when the interleave factor is equal to 8. During a half-cycle oscillation of the micro-mirror, optical pulses may be emitted for the scanning directions or lines $d_1, d_9, d_{17}, \ldots d_{249}$, as illustrated in FIG. 16. Then, optical pulses may be emitted for the scanning directions or lines $d_2, d_{10}, d_{18}, \ldots d_{250}$ during a second half-cycle oscillation of the micro-mirror, as illustrated in FIG. 17, etc.

It should be understood that, at the end of each full cycle of oscillation, the timing of the pulse of the light source needs to be shifted to generate the next series of pulses.

As one can observe from the results presented in Table 1, increasing the interleave factor allows increasing the non-ambiguous range of detection of objects since the time elapsed between the emission of two successive pulses increased which increases the detection time. Increasing the interleave factor further allows reducing the resonance frequency of the micro-mirror, thereby reducing the mechanical and physical constraints on the micro-mirror. However, the SNR improvement decreases with the increase of the interleave factor since the number of pulses that may be emitted for a same scanning direction during a single measurement. Therefore, a tradeoff may be found between a desired non-ambiguous range and an acceptable SNR improvement. In some embodiments, a tradeoff may also be desired between the resolution of the system, i.e., the number of scanning directions, and the memory available to store the detected echoes and the non-ambiguous range.

As described above, several optical pulses may be emitted along a same scanning direction in order to improve the SNR. In this case, the measured echoes for a same scanning direction are averaged to obtain an improved SNR. However, when the optical system is mounted on a moving vehicle, the time elapsed between the emission of different pulses along a same scanning direction may affect the quality of the result due to the speed of the vehicle, as illustrated in FIGS. 21 and 22A-22C.

Figure 21:
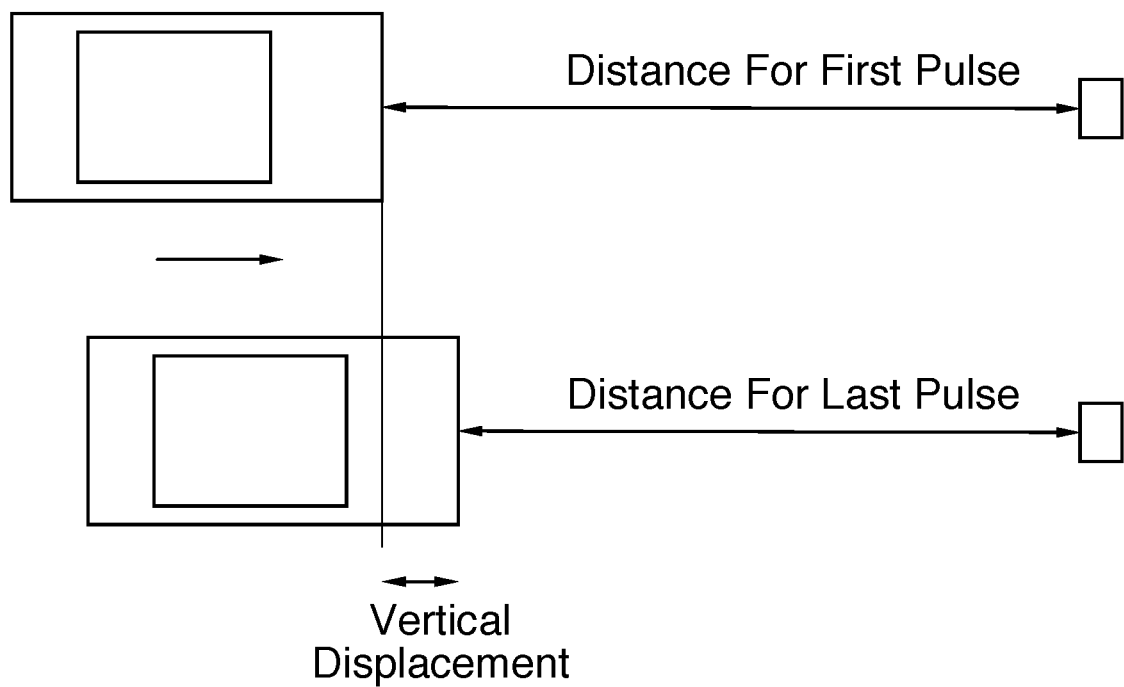
FIG. 21 illustrates the distance between a moving vehicle and an object, in accordance with the prior art.
Figure 22A:
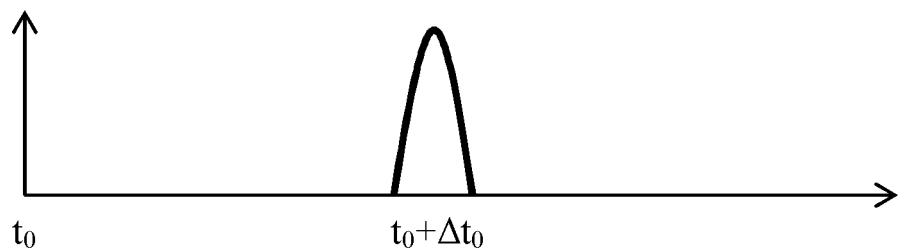
FIGS. 22A-22C illustrate the influence of the displacement of the vehicle of FIG. 21 on the detection timing of echoes, in accordance with an embodiment.
Figure 22B:
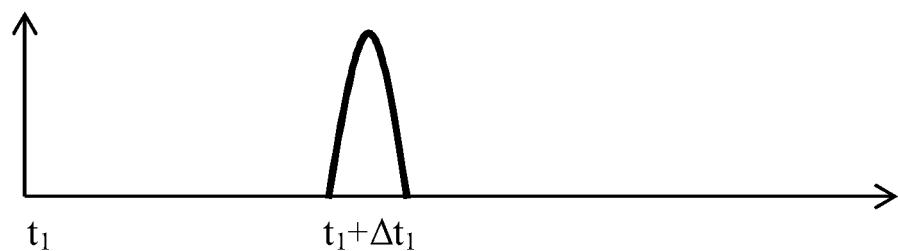
Figure 22C:
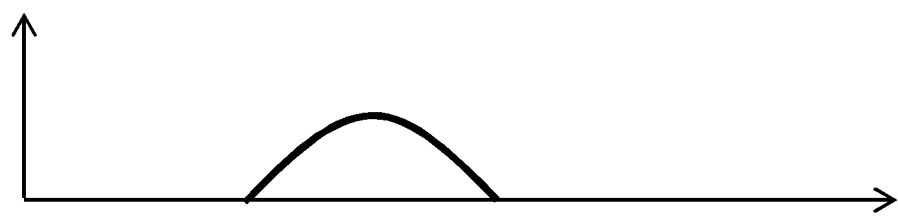

As illustrated in FIG. 21, when a vehicle is moving relative to a target object on which optical pulses are reflected, the distance between the vehicle and the object decreases. FIG. 22A illustrates the echo of a first pulse reflected on the object when the vehicle is in the first position of FIG. 21. In this case, a first optical pulse is emitted at time $t_0$ along a given direction. The echo illustrated in FIG. 22A is received at a time $t_0+\Delta t_0$. When a second pulse is emitted at time $t_1$, the vehicle has moved from the first position and is therefore closer to the object. The distance between the object and the optical system is then shorter and the difference between the time $t_1$ at which the second pulse is emitted and the time $t_1+\Delta t_1$ at which the second echo is received is shorter than the difference between the time $t_0$ at which the first pulse is emitted and the time $t_0+\Delta t_0$ at which the first echo is received, as illustrated in FIG. 22B. When averaging the first and second echoes for improving the SNR, the resulting averaged echo is temporally broadened as illustrated in FIG. 22C, which decreases the quality of the measurement.

Figure 28:
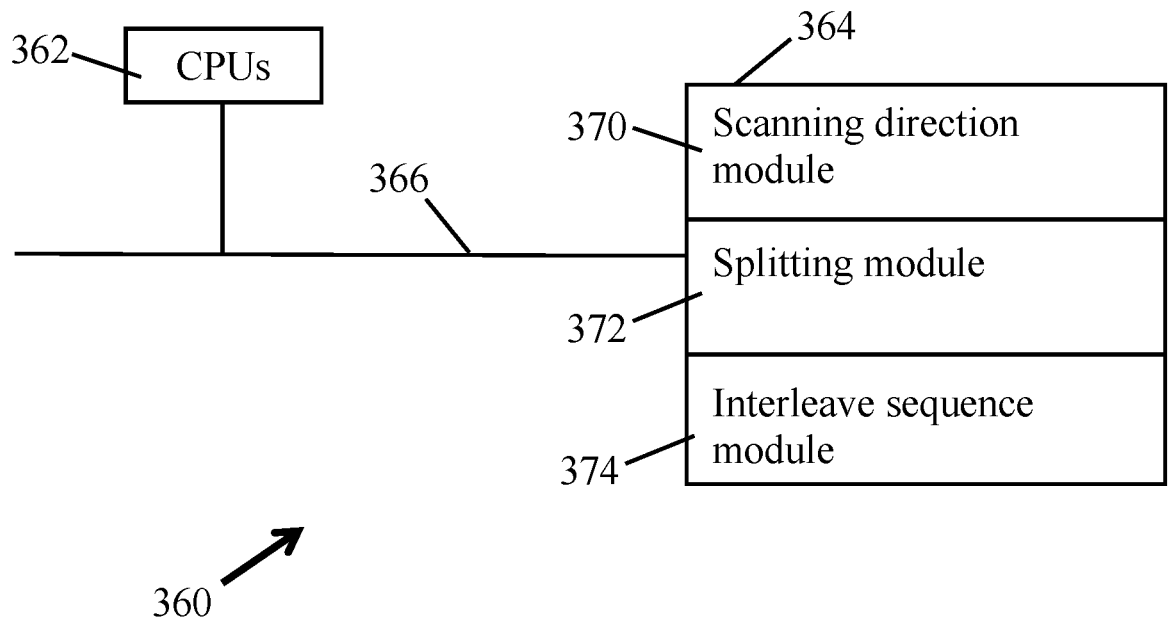
FIG. 28 is a block diagram of a processing module adapted to execute at least some of the steps of the method of FIG. 25, in accordance with an embodiment.

FIG. 28 is a block diagram illustrating an exemplary processing module 360 for executing the steps 320 to 324 of the method 318, in accordance with some embodiments. The processing module 360 typically includes one or more Computer Processing Units (CPUs) and/or Graphic Processing Units (GPUs) 362 for executing modules or programs and/or instructions stored in memory 364 and thereby performing processing operations, memory 364, and one or more communication buses 366 for interconnecting these components. The communication buses 356 optionally include circuitry (sometimes called a chipset) that interconnects and controls communications between system components. The memory 364 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 364 optionally includes one or more storage devices remotely located from the CPU(s) and/or GPUs 362. The memory 364, or alternately the non-volatile memory device(s) within the memory 364, comprises a non-transitory computer readable storage medium. In some embodiments, the memory 364, or the computer readable storage medium of the memory 364 stores the following programs, modules, and data structures, or a subset thereof:
a scanning direction module 370 for receiving a region of interest to be scanned and generating scanning directions in order to scan the region of interest;
a splitting module 372 for scanning directions into a plurality of direction subassemblies; and
an interleave sequence module 374 for generating an interleave sequence from the plurality of direction subassemblies.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 364 may store a subset of the modules and data structures identified above. Furthermore, the memory 364 may store additional modules and data structures not described above.

Although it shows a processing module 360, FIG. 28 is intended more as functional description of the various features which may be present in a management module than as a structural schematic of the embodiments described herein. In practice, and as recognized by those of ordinary skill in the art, items shown separately could be combined and some items could be separated.

Figure 27:
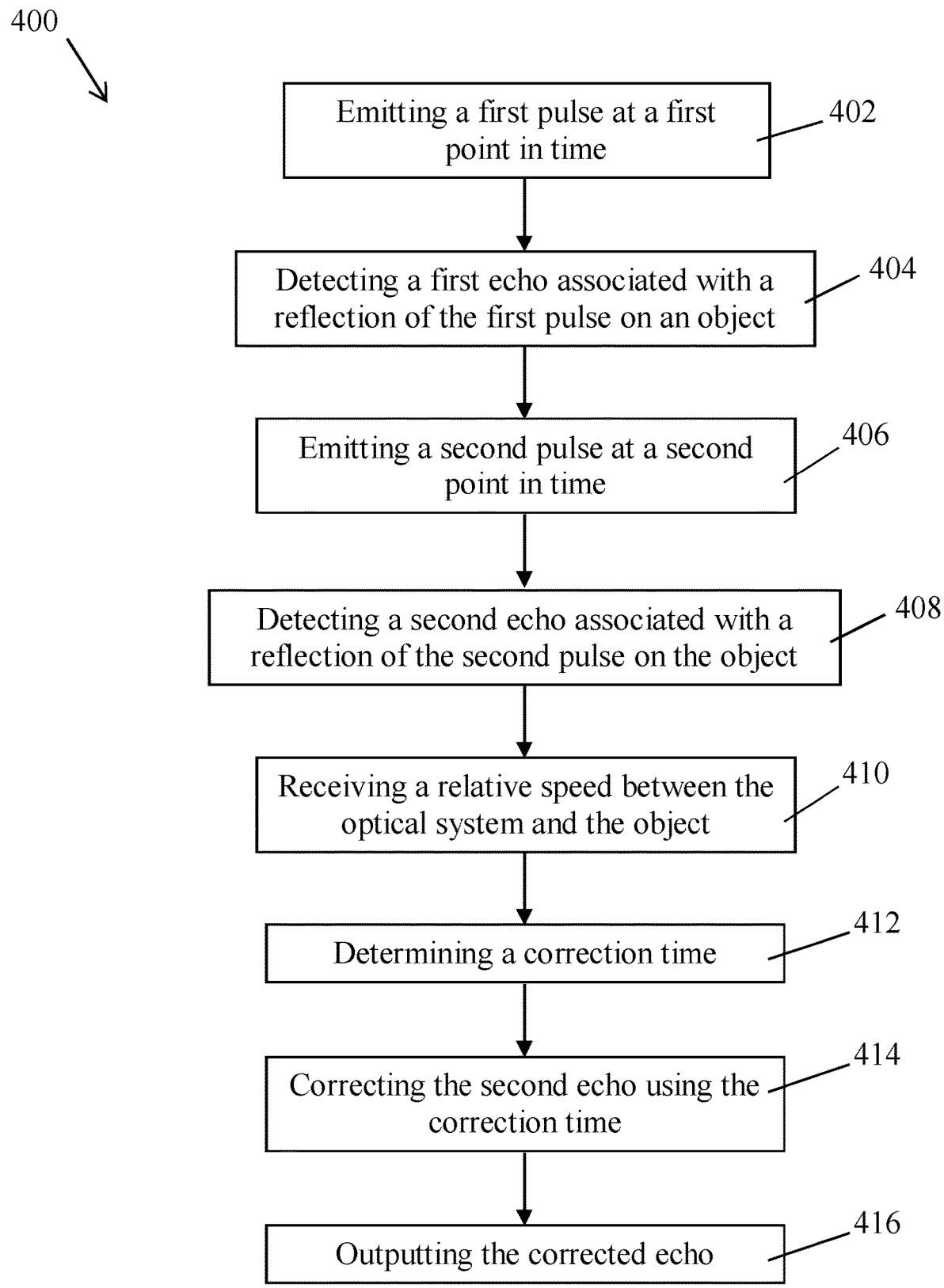
FIG. 27 is a flow chart of a method for compensating for the displacement of a vehicle, in accordance with an embodiment.

FIG. 27 illustrates one embodiment of a method 400 for correcting the temporal slippage of the echo when the relative position between the optical system such as the optical rangefinder system and an object varies in time.

Figure 23A:
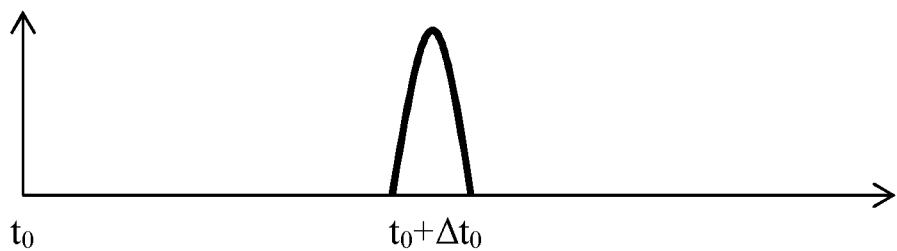
FIGS. 23A-23C illustrate the detection timing of echoes when the displacement of the vehicle is compensated, in accordance with an embodiment.

At step 402, a first optical pulse is emitted at a first point in time $t_0$. The first optical pulse is emitted along a given direction. The optical pulse is reflected by an object and a first echo generated by the reflection of the first optical pulse on the object is detected at a time equal to $t_0+\Delta t_0$, at step 404. The first echo is illustrated in FIG. 23A. The echo represents an optical intensity/amplitude measured as a function of time starting from the time at which the corresponding optical pulse has been emitted. FIGS. 22A and 22B presents exemplary echoes.

At step 404, a second optical pulse is emitted at time $t_1$. The second optical pulse is emitted along the given direction. The second optical pulse is also reflected by the object and a second echo generated by the reflection of the second optical pulse on the object is detected at a time equal to $t_1+\Delta t_1$, at step 406.

At step 408, the relative speed between the optical system and the object is received. In an embodiment in which the object has a fixed position and the optical rangefinder system moves relative to the object, the relative speed corresponds to the speed of the optical system, e.g. the speed of the vehicle on which the optical system is mounted. In an embodiment in which the optical system has a fixed position and the object moves relative to the optical system, the relative speed corresponds to the speed of the object.

In one embodiment, the method 400 further comprises the step of measuring the relative speed between the optical system and the object. In an embodiment in which the object has a fixed position and the optical system moves relative to the object and is mounted on a vehicle, the speed may be measured using the speedometer of the vehicle. In another embodiment, the speed may be measured by measuring the position of the optical system using a GPS for example and the time at which optical pulses are emitted. The speed may also be measured using an accelerometer or any other adequate device.

At step 410, a correction time $\delta t$ is calculated using the received relative speed. At step 412, the correction time corresponds to the time to be added to the time at which the second echo is detected to compensate for the relative motion between the optical system and the object, and is expressed as follows:

$$\delta t = \Delta t_0 - \Delta t_1$$

The distance $\Delta L$ covered by the optical system between the emission of the first and second pulses may be expressed as:

$$\Delta L = L_0 - L_1$$

where $L_0$ is the distance between the optical system and the object at the time $t_0$ and $L_1$ is the distance between the optical system and the object at the time $t_0$.

The distances $L_0$ and $L_1$ are defined as follows:

$$L_0 = c \cdot (\Delta t_0/2)$$

$$L_1 = c \cdot (\Delta t_1/2)$$

where c is the speed of light.

The distance $\Delta L$ may also be expressed as a function of the speed of the optical system relative to the object as follows:

$$\Delta L = v \cdot (t_1 - t_0)$$

Therefore:

$$\Delta L = L_0 - L_1 = v \cdot (t_1 - t_0)$$

By substituting $L_0$ and $L_1$ by their expression, we obtain:

$$c \cdot (\Delta t_0/2) - c \cdot (\Delta t_1/2) = v \cdot (t_1 - t_0) \text{ and}$$

$$c \cdot (\Delta t_0 - \Delta t_1)/2 = v \cdot (t_1 - t_0)$$

Since $\delta t = \Delta t_0 - \Delta t_1$, the equation becomes:

$$c \cdot \delta t/2 = v \cdot (t_1 - t_0)$$

The correction time $\delta t$ is then expressed as follows:

$$\delta t = 2v \cdot (t_1 - t_0)/c$$

Figure 23B:
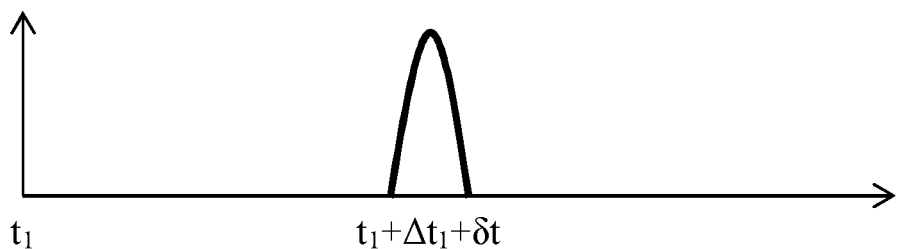

At step 414, the second echo is corrected using the correction time $\delta t$. The second echo is translated in time by an amount corresponding to the correction time $\delta t$. FIG. 23B illustrates the corrected second echo which is temporally aligned with the first echo.

At step 416, the corrected echo is outputted. For example, the corrected second echo may be stored in memory.

Figure 23C:
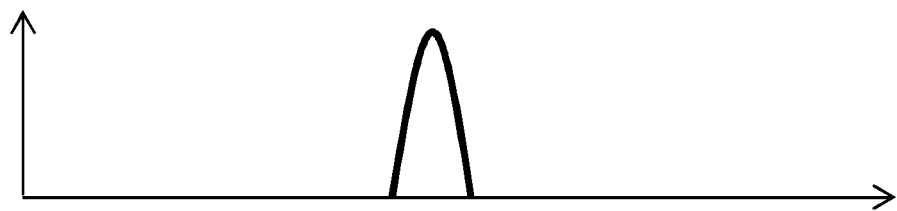

Once corrected, the second echo may be averaged with the first echo and the resulting averaged echo illustrated in FIG. 23C is no longer broadened with respect to the averaged echo of FIG. 22C when no correction is done.

When a plurality of optical pulses are emitted at different times along a same direction, the method 400 may be used for aligning the echoes corresponding to the emitted pulses in order to improve the quality of the measurement.

It should be understood that the method 400 may be executed by the controller of the optical system such as the controller of an optical rangefinder system. Alternatively, the method 400 may be executed by an independent computer machine connected to the optical system. In this case, the computer machine is provided with at least one processing unit, a memory and communication means. Statements and instructions to be executed by the processing unit are stored in the memory in order to perform the above-described correction method.

Figure 29:
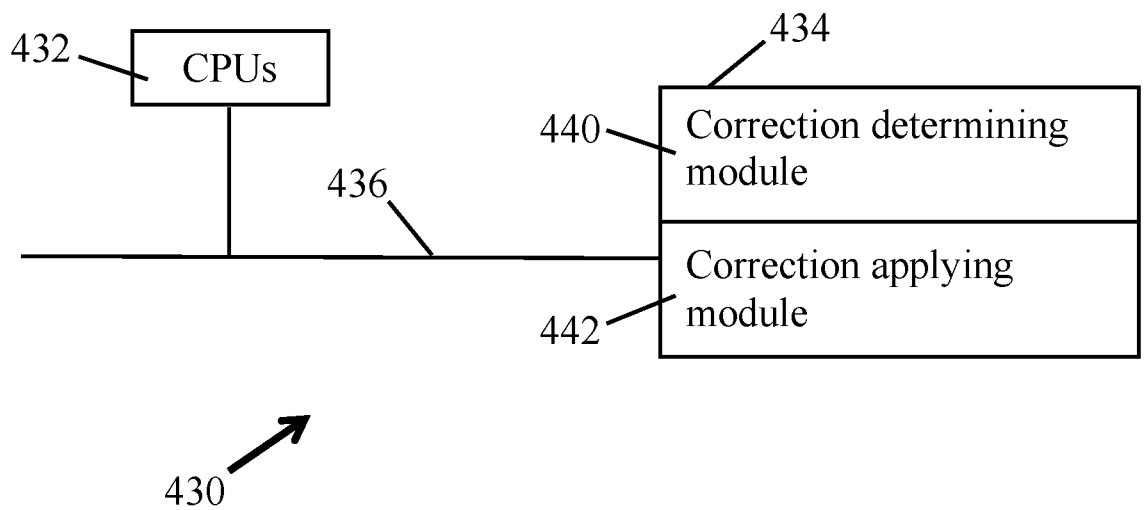
FIG. 29 is a block diagram of a processing module adapted to execute some of the steps of the method of FIG. 27, in accordance with an embodiment.

FIG. 29 is a block diagram illustrating an exemplary processing module 430 for executing the steps 410 to 416 of the method 400, in accordance with some embodiments. The processing module 430 typically includes one or more CPUs and/or GPUs 432 for executing modules or programs and/or instructions stored in memory 434 and thereby performing processing operations, memory 434, and one or more communication buses 436 for interconnecting these components. The communication buses 436 optionally include circuitry (sometimes called a chipset) that interconnects and controls communications between system components. The memory 434 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 434 optionally includes one or more storage devices remotely located from the CPU(s) and/or GPUs 432. The memory 434, or alternately the non-volatile memory device(s) within the memory 434, comprises a non-transitory computer readable storage medium. In some embodiments, the memory 434, or the computer readable storage medium of the memory 434 stores the following programs, modules, and data structures, or a subset thereof:

a correction determining module 440 for receiving a speed of displacement and determining a correction time using the speed of displacement, the above-described first and second points in time and a speed of light and a correction applying module 442 for correcting the second echo using the correction time and outputting the corrected echo.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 434 may store a subset of the modules and data structures identified above. Furthermore, the memory 434 may store additional modules and data structures not described above.

Although it shows a processing module 430, FIG. 29 is intended more as functional description of the various features which may be present in a management module than as a structural schematic of the embodiments described herein. In practice, and as recognized by those of ordinary skill in the art, items shown separately could be combined and some items could be separated.

The embodiments of the invention described above are intended to be exemplary only. The scope of the invention is therefore intended to be limited solely by the scope of the appended claims. Accordingly, the scope of the invention should not be construed as being limited to driver assistance/safety systems embarked in vehicles. The optical rangefinder instrument of the present invention can thus be integrated in fixed systems dedicated to traffic monitoring, for example at road intersections where various types of objects (vehicles, bicycles, pedestrians, pavement) should be reliably detected over wide fields of view in various weather conditions and under widely varying lighting conditions occurring from both natural and artificial sources. It can also be integrated in a mobile application such as in driver assistance applications in the automotive field of industry.

I claim:

1. A method for optically scanning a region according to a plurality of scanning directions, comprising:
   receiving an interleave sequence defining a scanning order for the plurality of scanning directions;
   sequentially propagating optical pulses according to the interleave sequence;
   detecting pulse echoes corresponding to a reflection of the propagated optical pulses on at least one object present within the region; and
   outputting the detected pulse echoes.

2. The method of claim 1, wherein said receiving the interleave sequence comprises: receiving the plurality of scanning directions; and
   generating the interleave sequence.

3. The method of claim 2, wherein said receiving the plurality of scanning directions comprises:
   receiving a total scanning range;
   receiving one of a number of scanning directions and a field of view per scanning direction; and
   determining the scanning directions.

4. The method of claim 2, wherein said generating the interleave sequence comprises:
   splitting the plurality of scanning directions into a plurality of direction subassemblies; and
   generating the interleave sequence using the direction subassemblies.

5. The method of claim 1, further comprising repeating:
   said sequentially propagating optical pulses according to the interleave sequence;
   said detecting pulse echoes corresponding to the reflection of the propagated optical pulses on the at least one object present within the region; and
   said outputting the detected pulse echoes.

6. A system for optically scanning a region according to a plurality of scanning directions, comprising:
   a controller for receiving an interleave sequence defining a scanning order for the plurality of scanning directions;
   a pulsed light source for sequentially propagating optical pulses according to the interleave sequence;
   a photodetector for detecting pulse echoes corresponding to a reflection of the propagated optical pulses on at least one object present within the region; and
   outputting the detected pulse echoes.

7. The system of claim 6, wherein the controller is configured for:
   receiving the plurality of scanning directions; and
   generating the interleave sequence.

8. The system of claim 7, wherein the controller is configured for:
   receiving a total scanning range;
   receiving one of a number of scanning directions and a field of view per scanning direction; and
   determining the scanning directions.

9. The system of claim 7, wherein the controller is configured for:
   splitting the plurality of scanning directions into a plurality of direction subassemblies; and
   generating the interleave sequence using the direction subassemblies.

10. The system of claim 6, wherein the system is further configured for repeating:
    said sequentially propagating optical pulses according to the interleave sequence;
    said detecting pulse echoes corresponding to the reflection of the propagated optical pulses on the at least one object present within the region; and
    said outputting the detected pulse echoes.

* * * * *